(12) United States Patent
Sugizaki

(10) Patent No.: US 11,906,456 B2
(45) Date of Patent: Feb. 20, 2024

(54) SENSOR ELEMENT, SENSOR DEVICE, SENSOR SYSTEM AND DETECTION METHOD

(71) Applicant: KABUSHIKI KAISHA TOSHIBA, Tokyo (JP)

(72) Inventor: Yoshiaki Sugizaki, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 369 days.

(21) Appl. No.: 17/204,512

(22) Filed: Mar. 17, 2021

(65) Prior Publication Data

US 2022/0082520 A1    Mar. 17, 2022

(30) Foreign Application Priority Data

Sep. 17, 2020   (JP) ................................. 2020-155958

(51) Int. Cl.
*G01N 27/12*    (2006.01)
*G01N 27/414*   (2006.01)

(52) U.S. Cl.
CPC ......... *G01N 27/122* (2013.01); *G01N 27/125* (2013.01); *G01N 27/4141* (2013.01)

(58) Field of Classification Search
CPC . G01N 27/122; G01N 27/125; G01N 27/4141
See application file for complete search history.

(56) References Cited

U.S. PATENT DOCUMENTS

| | | | |
|---|---|---|---|
| 2015/0323482 A1* | 11/2015 | Shimoyama | G01N 33/004 73/31.06 |
| 2018/0275084 A1 | 9/2018 | Saito et al. | |
| 2018/0313784 A1* | 11/2018 | White | G01N 27/4146 |

(Continued)

FOREIGN PATENT DOCUMENTS

| | | | | |
|---|---|---|---|---|
| CN | 106233481 A | * | 12/2016 | ........... G01N 27/414 |
| JP | 2018-163146 A | | 10/2018 | |

(Continued)

OTHER PUBLICATIONS

G. Chen, et al., "Sub-ppt gas detection with pristine graphene," Applied Physics Letters, vol. 101, No. 5, pp. 053119-1 to -4 (2012).

(Continued)

*Primary Examiner* — Benjamin R Schmitt
(74) *Attorney, Agent, or Firm* — Finnegan, Henderson, Farabow, Garrett & Dunner, LLP

(57) ABSTRACT

According to one embodiment, a sensor element capable of detecting a target substance contained in an atmosphere is disclosed. The sensor includes a graphene, a drain electrode provided on the graphene, a source electrode adhered to the graphene, and a first substance provided on the graphene and having a charge condition. The charge condition is changed when irradiation of light and stopping of the irradiation of the light are performed. The target substance is detectable by measuring current that flows between the source electrode and the drain electrode. The measuring of the current is performed in a period during which the irradiation of the light and the stopping of the irradiation of the light are repeated above the sensor element.

20 Claims, 13 Drawing Sheets

(56) References Cited

U.S. PATENT DOCUMENTS

| | | | |
|---|---|---|---|
| 2019/0003998 A1 | | 1/2019 | Ellis et al. |
| 2019/0086327 A1 | | 3/2019 | Atsuta et al. |
| 2019/0360958 A1 | * | 11/2019 | Choa .................... G01N 33/005 |
| 2020/0088641 A1 | | 3/2020 | Sugizaki et al. |

FOREIGN PATENT DOCUMENTS

| | | | | |
|---|---|---|---|---|
| JP | 2019-56602 A | | 4/2019 | |
| JP | 2020-46196 A | | 3/2020 | |
| WO | WO-2005026694 A2 | * | 3/2005 | ............. B82Y 10/00 |
| WO | WO-2017174534 A1 | * | 10/2017 | ............. G01N 21/77 |

OTHER PUBLICATIONS

M. Ebrahimi, et al., "Systematic Evolution of Ligands by Exponential Enrichment Selection of Specific Aptamer for Sensing of Methamphetamine," Sensor Letters, vol. 11, No. 3, pp. 566-570 (2013).
S. Hoshino, et al., "Resistive Hydrogen Sensors Consisting of Platinum Nanoparticles," $63^{rd}$ Japan Society of Applied Physics Spring Academic Lecture, p. 21p. S322-9 (2016).
Y. Lee, et al., "Photogating in the Graphene-Dye-Graphene Sandwich Heterostructure," ACS Applied Materials & Interfaces, vol. 11, No. 26, pp. 23474-23481 (2019).
Fujitsu Laboratories Ltd., "Fujitsu Develops World's First Gas Sensor to Apply a New Principle for Graphene Use," (Press Release), 3 pages (2016).

* cited by examiner

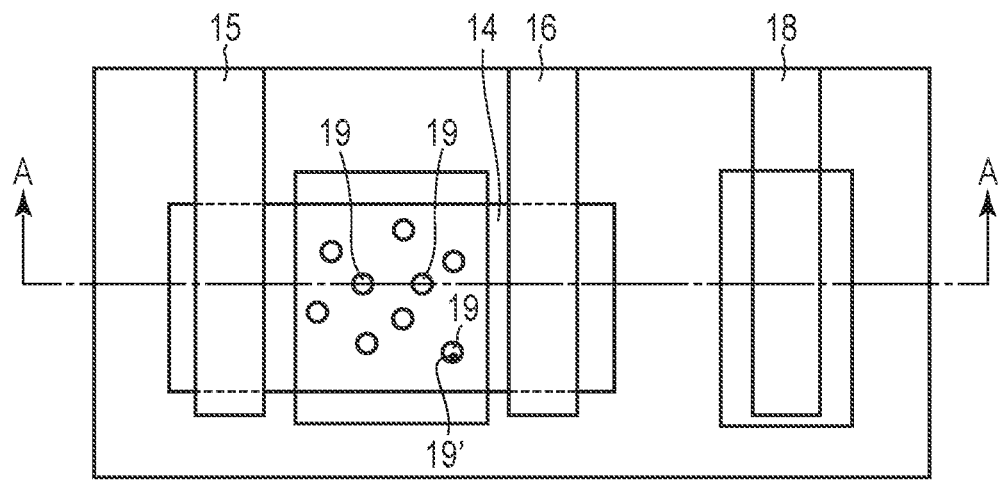
F I G. 1
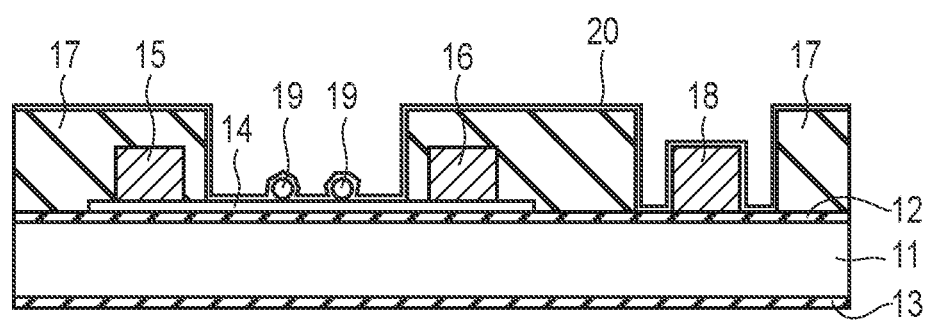
F I G. 2

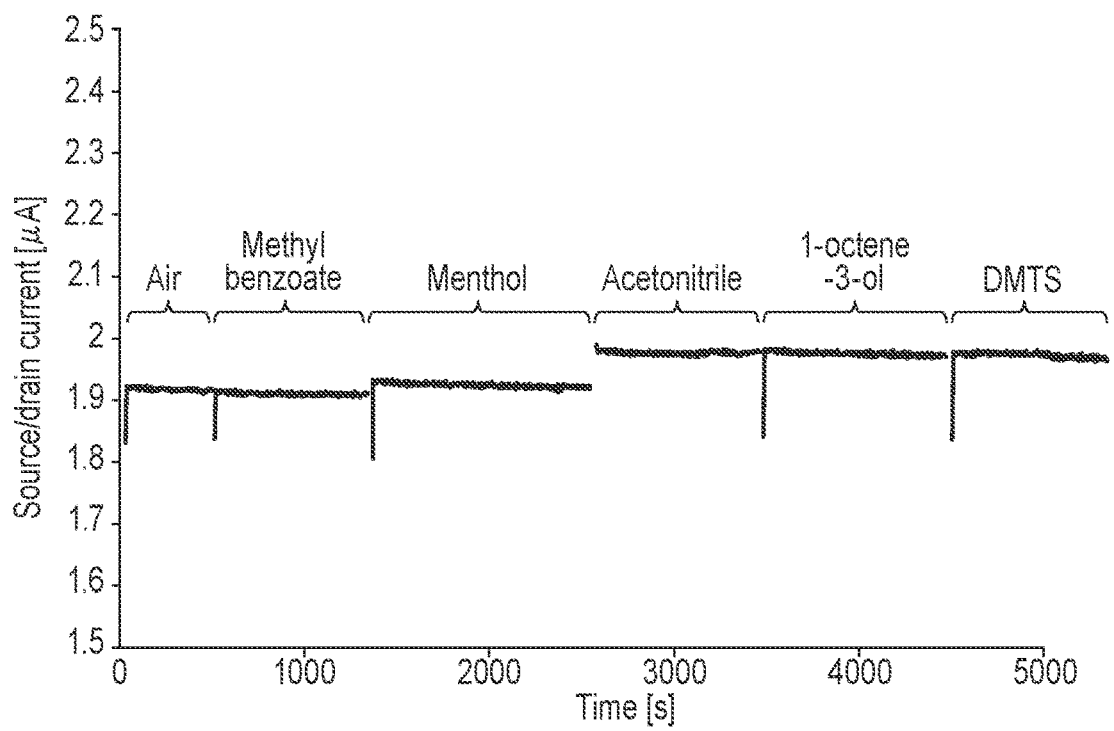
F I G. 11
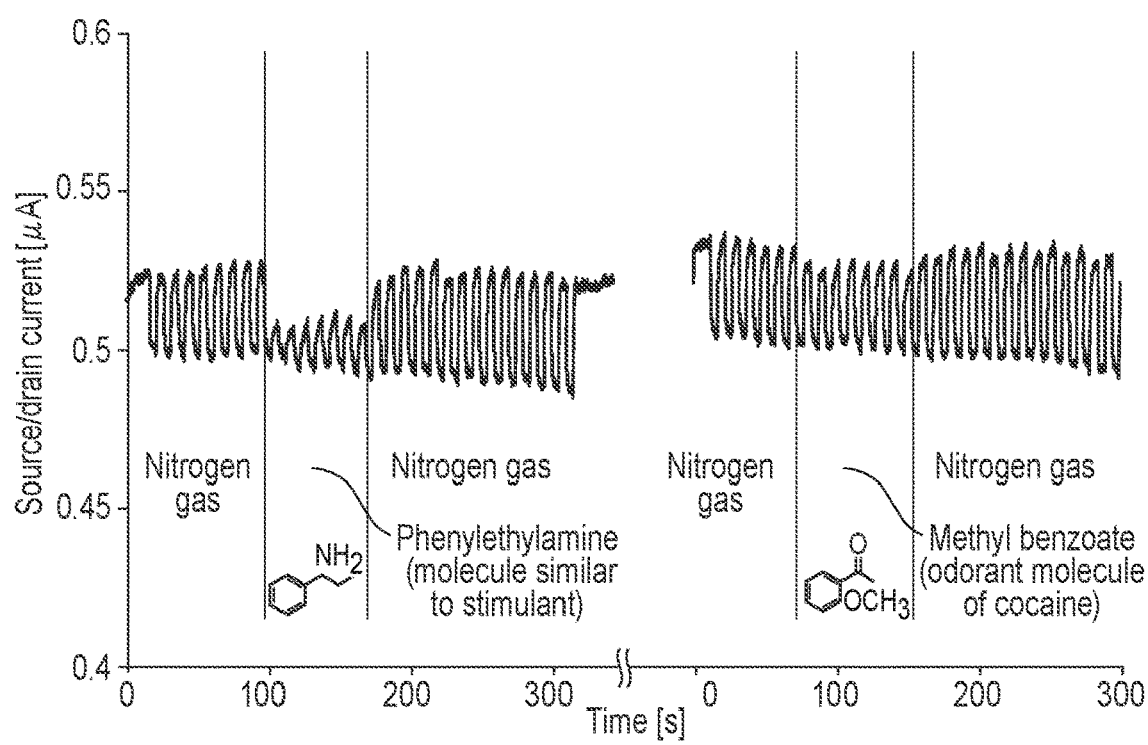
F I G. 12

SENSOR ELEMENT, SENSOR DEVICE, SENSOR SYSTEM AND DETECTION METHOD

CROSS-REFERENCE TO RELATED APPLICATIONS

This application is based upon and claims the benefit of priority from Japanese Patent Application No. 2020-155958, filed Sep. 17, 2020, the entire contents of which are incorporated herein by reference.

FIELD

Embodiments described herein relate generally to a sensor element, a sensor device, a sensor system and a detection method.

BACKGROUND

As one of the sensor elements which detects a gas or an odor, graphene FETs which employ graphene are known. However, the kinds of target substances which can be detected with the conventional graphene FETs are limited, and further it is difficult to identify the kind by selective detection.

BRIEF DESCRIPTION OF THE DRAWINGS

FIG. 1 is a plan view of a graphene FET according to an embodiment.

FIG. 2 is a cross-sectional view of the graphene FET, taken along an arrow of A-A in FIG. 1.

FIG. 11 is a diagram indicating experimental results of the case where a conventional graphene FET was used.

FIG. 12 is a diagram showing the change in source/drain current along with time in each of the cases where a nitrogen gas containing 2-phenylethylamine was supplied to the graphene FET of the embodiment and where nitrogen gas was supplied thereto.

DETAILED DESCRIPTION

Figure 3A:
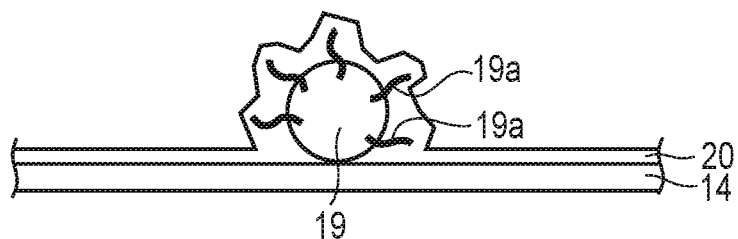
FIGS. 3A to 3E are diagrams showing a first substance and a second substance.

In general, according to one embodiment, a sensor element capable of detecting a target substance contained in an atmosphere is disclosed. The sensor element includes a graphene, a drain electrode provided on the graphene, a source electrode provided on the graphene, and a first substance provided on the graphene and having a charge condition is changed when irradiation of light and stopping of the irradiation of the light are performed. The target substance is detectable by measuring current that flows between the source electrode and the drain electrode. The measuring of the current is performed in a period during which the irradiation of the light and the stopping of the irradiation of the light are repeated above the sensor element.

Embodiments will be described hereinafter with reference to the accompanying drawings. The drawings are schematic or conceptual drawings, and dimensions and ratios are not necessarily the same as those in reality. Further, in the drawings, the same reference symbols (including those having different subscripts) denote the same or corresponding parts, and overlapping explanations thereof will be made as necessary. In addition, as used in the description and the appended claims, what is expressed by a singular form shall include the meaning of "more than one".

FIG. 1 is a plan view of a graphene FET 1 (a sensor element) according to the embodiment. FIG. 2 is a cross-sectional view of the graphene FET 1, taken along an arrow 2-2 in FIG. 1.

The graphene FET 1 comprises a silicon substrate 11, an insulating film 12, an insulating film 13, a graphene 14, a drain electrode 15, a source electrode 16, an insulating film 17, a gate electrode 18, a first substance 19 and a high electric resistance (hereinafter, referred as high-resistance) conductive layer 20.

The insulating film 12 is provided on a surface of the silicon substrate 11, and it is, for example, a silicone oxide film. The insulating film 13 is provided on a rear surface of the silicon substrate 11, and it is, for example, a silicone oxide film.

The graphene 14 is provided on a region of a part of the insulating film 12. The graphene 14 may be in a form of a single-layer or multilayer film. The graphene 14 is used as a channel of the FET.

The drain electrode 15 is provided on one end portion of the graphene 14. The drain electrode 15 is adhered or connected to the graphene 14.

The source electrode 16 is provided on the other end portion of the graphene 14. The source electrode 16 is adhered or connected to the graphene 14.

The first substance 19 is provided on the graphene 14 located between the drain electrode 15 and the source electrode 16. Note that, as shown in FIGS. 3A to 3E, a second substance 19a may be adsorbed to or bound with the first substance 19, or the second substance 19a may be adsorbed or bound on the graphene 14.

In FIG. 3A, the second substance 19a is adhered to or bound with the first substance 19, and the first substance 19 and the second substance 19a are covered by the high-resistance conductive layer 20.

Figure 3B:
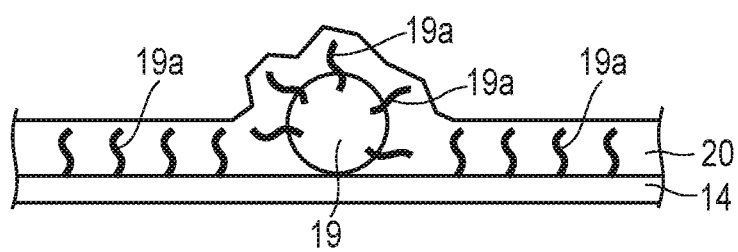

In FIG. 3B, the first substance 19 and the second substance 19a are adsorbed to or bound with the graphene 14, and the first substance 19 and the second substance 19a are covered by the high-resistance conductive layer 20.

Figure 3C:
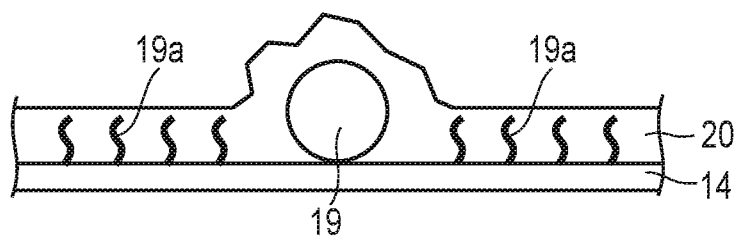

In FIG. 3C, the second substance 19a is adhered to or bound with the graphene 14, and the first substance 19 and the second substance 19a are covered by the high-resistance conductive layer 20. The second substance 19a is not adhered to or bound with the first substance 19.

Figure 3D:
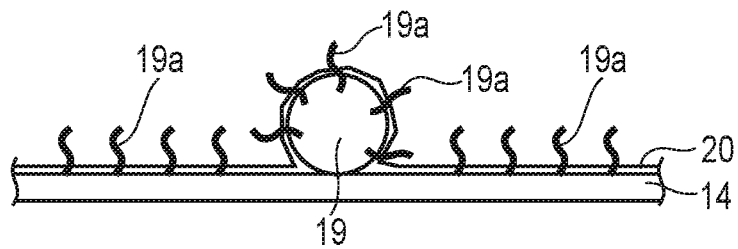

In FIG. 3D, the first substance 19 is adsorbed to or bound with the second substance 19a and the graphene 14. The first substance 19 is covered by the high-resistance conductive layer 20 and further the second substance 19a is covered by the high-resistance conductive layer 20 so that an upper end-side portion thereof ejects out of the high-resistance conductive layer 20.

Figure 3E:
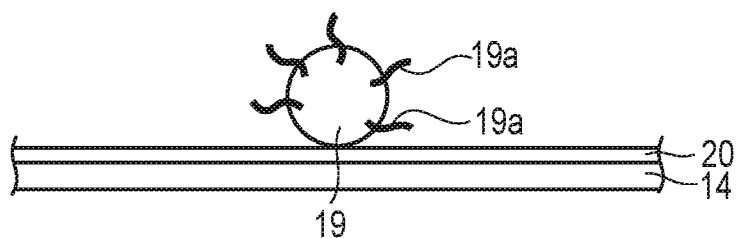

In FIG. 3E, the second substance 19a is adhered to or bound with the first substance 19, but the first substance 19 and the second substance 19a are not covered by the high-resistance conductive layer 20.

The second substance 19a is a substance which specifically bond to a target substance (a substance under detection). The second substance 19a is, for example, a molecular probe. The molecular probe contains, for example, an aptamer such as a nucleic acid aptamer or a peptide aptamer.

The insulating film 17 shown in FIG. 1 and FIG. 2 covers the drain electrode 15 and the source electrode 16, and also comprises an opening which exposes the graphene 14 from at least a part between the drain electrode 15 and the source electrode 16. The insulating film 17 is an insulating film which protects the drain electrode 15 and the source electrode 16 and is, for example, an inorganic insulating film such as silicon nitride film, alumina film or silicone oxide film, or an organic insulating film such as polyimide film, polybenzooxazole film, parylene film, benzocyclobutene (BCB) film, or polydimethylsiloxane (PDMS) film.

The gate electrode 18 is provided on the insulating film 12. In FIG. 1 and FIG. 2, the gate electrode 18 is disposed on a region of the insulating film 12, which is spaced away to a right direction from the source electrode 16 by a predetermined distance. Between the gate electrode 18 and the graphene 14, the high-resistance conductive layer 20 is formed. The conductive layer 20 should preferably cover the exposed surface which is not coated by the gate electrode 18 and the insulating film 17 of the graphene 14 as shown, but it may be formed underneath the gate electrode 18 and the graphene 14. Further, the conductive layer 20 may coat the surfaces of the first substance 19 and the second substance 19a (see FIGS. 3A to 3C). It is necessary that the electric resistance of the conductive layer 20 between the source electrode 16 and the drain electrode 15 should be sufficiently higher as compared to the electric resistance of the graphene 14 between the source electrode 16 and the drain electrode 15. Generally, the electric resistance of the graphene 14 between the source electrode 16 and the drain electrode 15 is about a few kΩ, and therefore the electric resistance of the conductive layer 20 between the gate electrode 18 and the graphene 14 preferably falls in a range that is equal to or greater than 10 MΩ and equal to or less than 100 kΩ. Further, as will be described later, the sensor element of the embodiment is used in a high-humidity atmosphere, and therefore the conductive layer 20 may be of a type which exhibits conductivity when absorbing moisture. Usable examples of the material (substance) of the conductive layer 20 are materials containing polar groups such as carboxyl group, phosphate group, sulfonic group, silanol group, hydroxyl group and amino group, a dried salt, and an ionic liquid of an ultrathin film. The polar group may be formed on the surfaces of the insulating film 12 and the insulating film 17 to form a layer where a surface leak may occur. Such a surface leak layer can be obtained by performing, for example, a UV ozone treatment. Alternatively, metal nanoparticles may be arranged to be made conductive by using plasmon. It is natural to use a conductive material for the gate electrode 18, but it is preferable that a substance such as gold, platinum, silver, silver chloride or the like (which is shown by a reference symbol "19'" in FIG. 1) is formed on the surface of the gate electrode 18, because the charge can be easily given or received with respect to the conductive layer 20.

When the irradiation of light is repeatedly carried out in an ON/OFF manner to the sensor element of the embodiment, there may be cases where the charge on the first substance 19 varies between during a first period where light is irradiated and a second period where light is not irradiated. In the following descriptions, a period when light (irradiation light) is irradiated is referred to as a light irradiation period, whereas a period when light (irradiation light) is not irradiated is referred to as a non-light-irradiation period.

For example, when light is irradiated onto the sensor element, graphene is activated and an excitation electron and a positive hole are created. Here, when the energy level of the first substance 19 is at an appropriate position such as to induce charge transfer, either one of the excitation electron and the positive hole of the graphene transfers the charge to vary the charge on the first substance 19. In this case, the first substance 19 behaves as an acceptor. When the irradiation of the light is stopped, the charge is discharged from the first substance 19.

Alternatively, when irradiating light of a wavelength which activates the first substance 19, the first substance 19 is activated to produce an excitation electron and a positive hole. Here, when the relationship between the energy level of the excitation electron and the hole of the first substance 19, the Fermi level of the graphene, and the energy level of the excitation electron and the positive hole of the graphene is at such a position to induce charge transfer, either one of the excitation electron and the positive hole of the first substance 19 transfers its charge to the graphene, and thus the charge on the first substance 19 varies. In this case, the first substance 19 behaves as a donor. When the irradiation of the light is stopped, the charge on the first substance 19 is discharged.

Alternatively, when the first substance 19 is made of the metal nanoparticles, the plasmon is activated by the irradiation of the light. Here, when the positions of the energy level of the plasmon, the Fermi level and the graphene and the energy level of the excitation electron and the positive hole are in such a relationship that may induce the charge transfer, plasmon induction charge transfer occurs to vary the charge on the first substance 19. In this case, the metal nanoparticles behave as either a donor or acceptor. When the irradiation of the light is stopped, the charge on the first substance 19 is discharged.

As described above, when a material behaving as a donor or an acceptor is used for the first substance 19, the charge on the first substance 19 varies by blinking of light (ON/OFF of light irradiation). That is, when provided on the graphene, the first substance becomes changeable in charge condition by irradiation of light and stopping. When the charge on the first substance 19 varies, a charge opposite to the charge on the material 19 that is electrostatically induced onto the graphene and thus the Fermi level of the graphene changes. Further, at this time, when the conductive layer coats the entire surface of the graphene, the charge on the first substance 19 causes electrostatic induction on the entire graphene, and thus the change in Fermi level is caused on the entire graphene. When the Fermi level of the graphene changes, the carrier density changes accordingly, and the source/drain current changes. The above-described behavior is called a photogating effect. The first substance 19 is a material which can induce charge transfer between the graphene and itself. The first substance is, for example, a material containing a carboxyl group, a phosphate group, a sulfonic group, a silanol group, a hydroxyl group or an amino group, or metallic particles, or the like. The metal particles are, for example, gold nanoparticles. Or, a material having band gaps such as a semiconducting material or a dielectric material, a material constituted by crystals with lattice defects, a material containing delocalized n electrons, molecule containing a strong electron attractive part such as halogens may as well be the first substance.

The graphene FET 1 can be used as, for example, an odor sensor. A gas sensor using a graphene FET is conventionally known, and the conventional gas sensor employs a method of reading a change in the current that follows between the source electrode and the drain electrode, which may be caused by adsorption of gas. The current is generated by a difference between a potential of the source electrode and a potential of the drain electrode. Hereinafter, the current is referred to as a source/drain current.

This method requires that the gas need to be strongly charged when adhered to the graphene, and the detectable gases are limited. More specifically, the gases are limited to NOX gases of strong acceptor molecules, ammonium gas of a strong donor molecule and the like. When these molecules are adsorbed to the graphene, charge transfer occurs between the graphene and itself, so as to be charged. As a result, a charge opposite to the charge of the adsorption molecule is electrostatically induced to the graphene, and thus the Fermi level changes and accordingly the source/drain current changes.

The graphene FET 1 is different from the gas sensor using the conventional graphene in that it utilizes the photogating effect to detect a target substance such as an odor or the like. In the case of the sensor element of the present embodiment, the material whose charge changes due to the static induction of the graphene is not an odorant molecule to be detected, but the first substance 19. The odorant molecule to be detected can be detected if the change in the charge of the first substance 19 is inhibited or promoted, and therefore the odorant molecule need not be a strong donor or acceptor. The change in the charge of the first substance 19 can be caused by various processes that may induce the change in charge of the first substance 19, which include the change in electric resistance of the conductive layer 20, the inhibition or promotion of the charge transfer between the graphene and the first substance 19, the change in energy level of the graphene and the first substance 19, the change in excitation wavelength of the first substance 19 and the like. Further, such odorant molecules which dissociate in aqueous solutions to be able to have charge can be also detected by the sensor element of the embodiment. For example, 2-phenylethylamine is a univalent cation having an acid dissociation constant of 9.9 (an estimated value). But even if the graphene FET is exposed to a 2-phenylethylamine atmosphere, the source/drain current of the graphene FET changes only gently. Here, the noise caused by external disturbance such as a variation in humidity or the like is greater as compared to the change, which makes it difficult to detect the change. With use of the sensor element of the embodiment, the presence of 2-phenylethylamine can be clearly detected.

Figure 4:
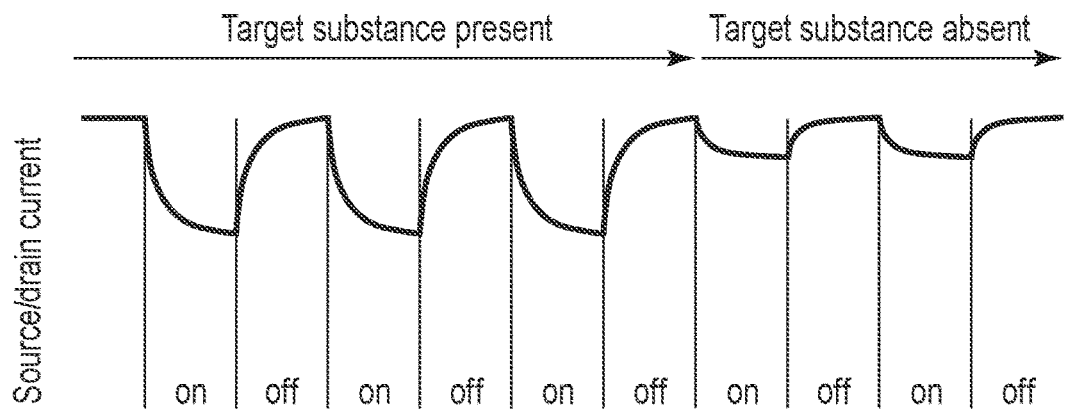
FIG. 4 is a diagram showing change in source/drain current of the graphene FET of the embodiment along with time according to the presence or absence of a target substance.

FIG. 4 is a diagram showing the change in source/drain current (detection current) of the graphene FET along with the time of the present embodiment depending on the presence or absence of a target substance. The indications "on" and "off" of the horizontal axis respectively express a light irradiation period and a non-light irradiation period. The on/off cycle of the light irradiation is in a range of, for example, ten milliseconds to several tens of seconds. The wavelength of light is, for example, 650 nm.

As shown in FIG. 4, the source/drain current of the light irradiation period and the source/drain current of the non-light irradiation period are different from each other. The reason why is considered as follows.

During the light irradiation period, the graphene is activated by light, and excitation electrons and positive holes are produced in the graphene 14. Further, during the light irradiation period, charge remains on the first substance 19 on the graphene 14. For example, in the case of a donor, the donor produces an excitation electron and a positive hole during the light irradiation period. The excitation electron or the positive hole does not remain in the place where it is produced, but the charge moves to the graphene. As a result, charge transfer does not occur to the donor and the charge remains.

Into the graphene 14, a charge reverse to that of the first substance 19 is drawn by electrostatic induction. As a result, the position of the Fermi level of the graphene 14 changes, and the source/drain current changes. On the other hand, during the non-light irradiation period, the charge is released from the first substance 19 and the electrostatic induction does not occur. As a result, the Fermi level returns to the original position, and the source/drain current is also restored. Note that when the first substance is a substance having a work function different from that of the graphene, the first substance may have a charge even if it is not subjected to light irradiation. Even in this case, the charge of the first substance changes if such charge transfer as described above occurs. As a result, the Fermi level of the graphene changes by a change of the electrostatic induction, and therefore the target substance can be detected as the change in source/drain current FIG. 4 is an image diagram illustrating the state of the change in source/drain current when the odor molecule as a target is detected using the sensor element of the embodiment. The source/drain current greatly changes between the presence and absence of irradiation light. The change in source/drain current between the presence and absence of the irradiation light clearly appears as a difference in amplitude between the case where there is a target substance and the case where there is not. That is, according to the intensive studies of the present inventors, the graphene FET of the embodiment utilizing the photogating effect can easily detect the target substance based on the amplitude in change of the source/drain current created by the presence and absence of the light irradiation. That is, the target substance can be detected by measuring the current flowing between the source electrode and the drain electrode.

Note that FIG. 4 shows an example case where a first difference (created when there is a target substance), which is the change in source/drain current is less than a second difference (created when there is no target substance), but the first difference (there is a target substance) may be greater than the second difference (there is no target substance) depending on the first substance 19.

Figure 5:
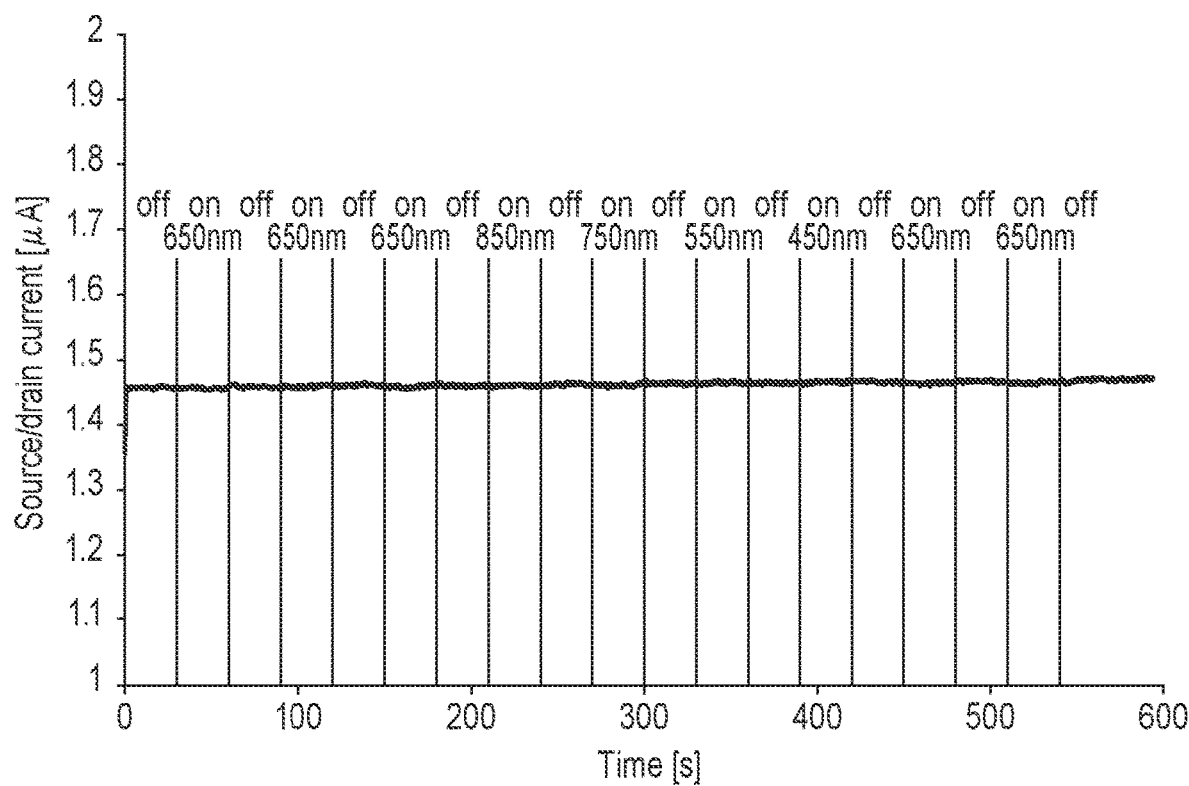
FIG. 5 is a diagram showing change in source/drain current of the graphene FET of the embodiment along with time when exposed to a dry atmosphere.

FIG. 5 is a diagram showing the change in source/drain current with time when the graphene FET of the embodiment is exposed to a dry atmosphere (an environment in which the amount or ratio of steam in the atmosphere is less than a certain level).

It is confirmed from FIG. 5 that when exposing the graphene FET of the embodiment to a dry atmosphere, the change in source/drain current created between the presence and absence of irradiation light is very small. This is considered because any of the processing steps which induce the photogating effect (photoresponse) is inhibited in the dry atmosphere.

Next, the graphene FET of the embodiment was examined in terms of the change in source/drain current with time when exposed to a high humidity atmosphere (an environment in which the amount or ratio of steam in the atmosphere exceeds a certain value). More specifically, the graphene FET of the embodiment was contained in an air tight container with a cup in which pure water is injected, and the change in source/drain current with time was examined.

Figure 6:
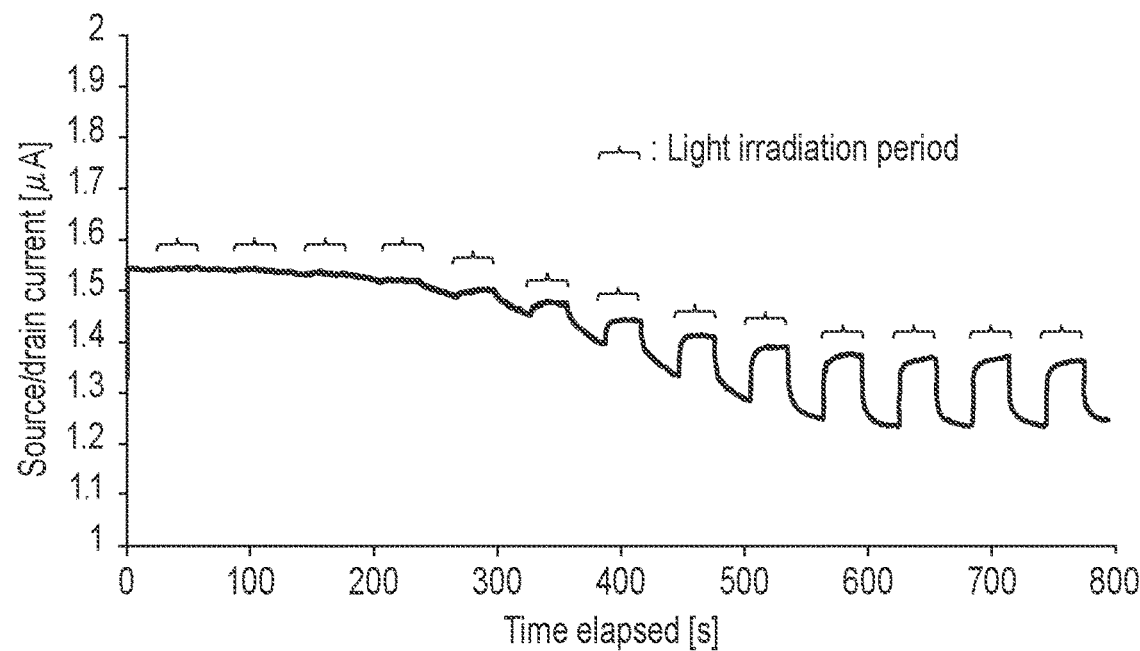
FIG. 6 is a diagram showing change in source/drain current of the graphene FET of the embodiment along with time when contained in a container in which a pure water is injected.

FIG. 6 is a diagram showing the change in source/drain current with time when the graphene FET of the embodiment was contained in an air tight container with pure water.

It is found from FIG. 6 that the difference in source/drain current created between the presence and absence of light irradiation is less before a predetermined time period passes, and the difference in source/drain current is great after the predetermined time period has passed. The results can be analyzed as follows.

It requires a certain amount of time until the pure water in the container transforms into steam. Therefore, the amount and the ratio of the steam in the container are less than certain values before the predetermined period of time passes, and the amount and ratio of the steam in the container exceed the certain values after the predetermined period of time has passed. That is, the predetermined period of time has passed, the graphene FET of the embodiment is exposed to within a high humidity atmosphere. Therefore, the results of the measurement shown in FIG. 6 are considered to indicate that when a high-humidity gas is supplied to the graphene FET (graphene) of the embodiment, the photogating effect (photoresponse) of the graphene FET of the embodiment is amplified.

The reason why the photogating effect is amplified in the case of a high humidity atmosphere, for example, the followings are considered. When the first substance 19 is a donor, the donor produces an excitation electron and a positive hole during the light irradiation period. Either one of the excitation electron and the positive hole does not remain in the place where it was produced, but the charge remained after the charge transfer to the graphene is trapped by the donor. It is considered that the gas high humidity promotes the charge transfer, or trapping of the remaining charge, or both. Or it is considered to change the excitation wavelength of the donor for the promotion. In addition, in the graphene, a charge reverse to the charge of the donor is drawn by the electrostatic induction. Further, when the conductive layer is formed on the graphene, the charge on the donor spans to the entire graphene, and therefore electrostatic induction occurs in the entire graphene. It is considered that a high-humidity gas promotes the process of the electrostatic induction.

That is, it is considered that a high humidity promotes at least one of the excitation of the donor, the charge transfer, the charge trap and the electrostatic induction and, as a result, the photogating effect is amplified.

Here, the reason why the photogating effect is promoted when the first substance 19 is a donor, has been discussed. In the case as well where the first substance 19 is an acceptor, it is considered that at least one of the charge transfer, charge trap and electrostatic induction is promoted, and therefore the photogating effect is amplified. Further, in the case of metal nanoparticles, the plasmon excitation wavelength changes, and the photogating effect can be amplified.

Further, when a target substance is adsorbed to the graphene 14 or the first substance 19 or a target substance is trapped to the second substance 19a such as a molecular probe to change the structure of the second substance 19a, at least one of the excitation of the first substance, the charge transfer, charge trap and electrostatic induction is inhibited or promoted. Therefore, the photogating effect (photoresponse) can be changed by the adsorption of the target substance or the structural change of the second substance 19a as well.

Figure 7:
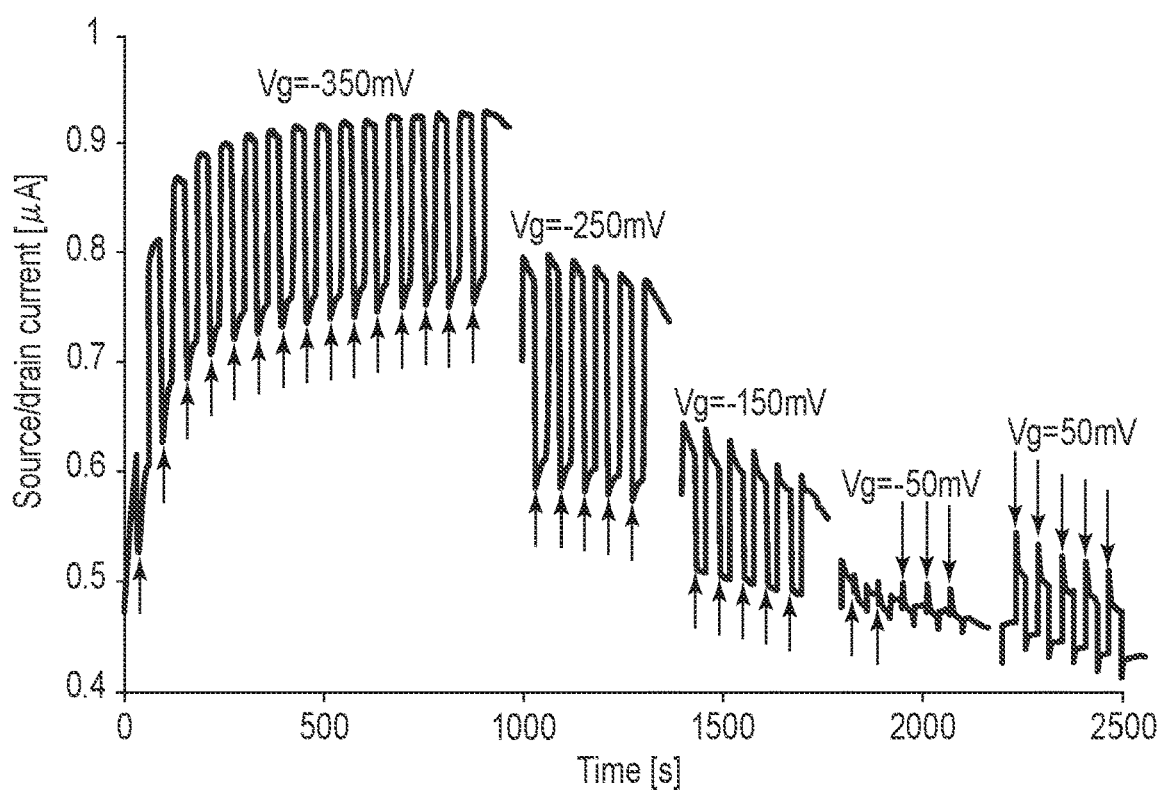
FIG. 7 is a diagram showing results of examination on the change in source/drain current along with time in a plurality of gate voltages of different values.

FIG. 7 is a diagram showing the results of examination of the change in source/drain current with time for each of a plurality of gate voltages (Vg) having different values. The illustration of the on/off operation of the irradiation light is complicated, the timing for irradiation of light is indicated by arrows in the drawing. The gate voltages are −350 mV, −250 mV, −150 mV, −50 mV and 50 mV.

It is understood from FIG. 7 that if the value of the gate voltage differs, the value and wavelength of the source/drain current also vary, and therefore the gate voltage affects the photogating effect (photoresponse). This means that the photogating effect (photoresponse) can be amplified by adjusting the gate voltage to an appropriate value. It is understood that when the gate voltage is increased from −350 mV to −50 mV, the absolute value of the source/drain current decreases, and the change in source/drain current by blinking of the irradiation light becomes smaller in a range from −250 mV to −50 mV. Further, from −350 mV to a middle of −50 mV, the source/drain current changes in a decreasing direction by the light irradiation, but it changes in a reverse direction from a middle of −50 mV, that is, in a direction in which the source/drain current increases by the light irradiation. Then, when the gate voltage is further increased to +50 mV, the rise in source/drain current by the light irradiation is increased. This phenomenon can be understood by illustrating the relationship between the source/drain current value while the irradiation of light and the source/drain current value while stopping the irradiation of light, read from the drawing and the gate voltages.

Figure 8:
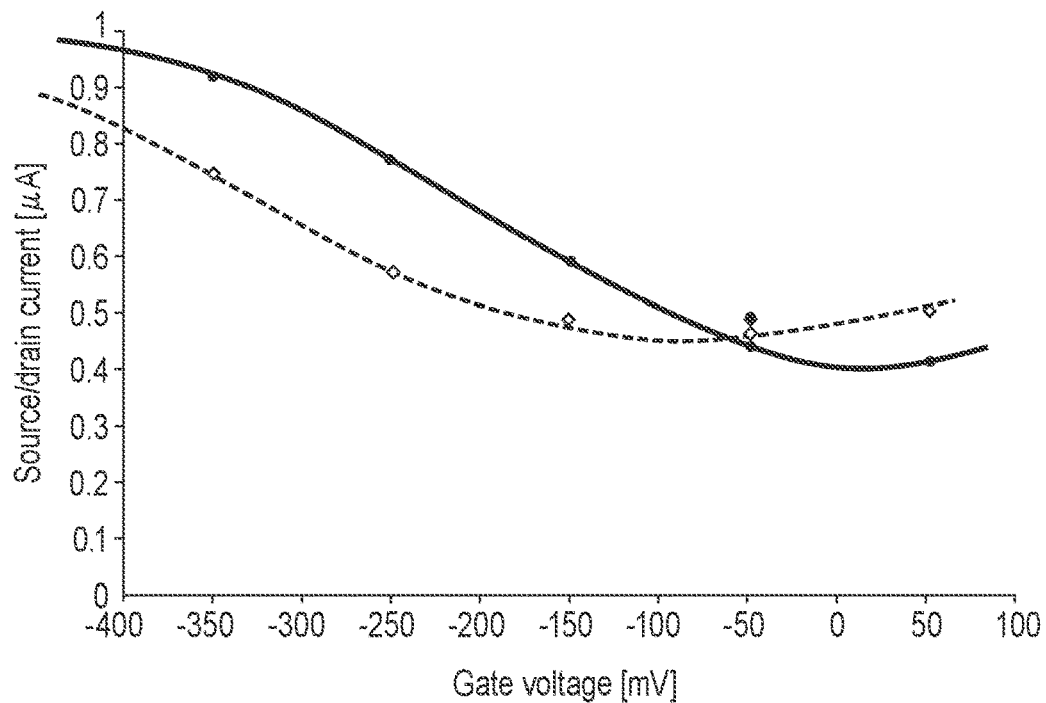
FIG. 8 is a diagram showing results of examination on a relationship between the source/drain current and the gate voltage during a light irradiation period and a non-light irradiation period.

FIG. 8 is a diagram showing the results of examination of the relationship between the source/drain current in the presence or absence of the light irradiation and the gate voltage. The results for the light irradiation period are indicated by white-space diamonds and broken lines, whereas the results for the non-light irradiation period are indicated by black circles and solid lines.

When the gate voltage (Vg) is at −350 mV, the source/drain current in the light irradiation period is lower than the source/drain current in the non-light irradiation period.

When the gate voltage is at −250 mV, the source/drain current in the light irradiation period is less than the source/drain current in the non-light irradiation period.

Here, when a current difference ΔI is defined as a difference obtained by subtracting the source/drain current during the light irradiation period from the source/drain current during the non-light irradiation period, the current difference ΔI in the case of Vg=−250 mV is greater than the current difference ΔI in the case of Vg=−350 mV.

When the gate voltage is −150 mV, the source/drain current in the light irradiation period is less than the source/drain current in the non-light irradiation period. But the current difference ΔI in the case of Vg=−150 mV is less than the current difference ΔI in the case of Vg=−350 mV or Vg=−250 mV.

When the gate voltage is −50 mV or more, the amplitude relationship between the source/drain current in the light irradiation period and the source/drain current in the non-light irradiation period reverses with time progress. Further, the absolute value of the current difference ΔI in the case of Vg=−50 mV is less than the current difference ΔI in the case of Vg=−350 mV, Vg=−250 mV or Vg=−150 mV both before and after inversion.

When the gate voltage is 50 mV, the source/drain current in the light irradiation period is higher than the source/drain current in the non-light irradiation period. In the case of Vg=50 mV, the current difference ΔI is a negative value, and the absolute value thereof is greater than the current difference ΔI after the inversion of the case of Vg=−50 mV.

The results obtained above can be analyzed as follows.

First, the reason why there rise a difference in value between the source/drain current in the light irradiation period and in the non-light irradiation period, is considered that the charge on the first substance 19 changes to a positive charge side by the light irradiation and the photogating effect (photoresponse) takes place.

The gate-voltage dependency of the source/drain current of the graphene is known to generally exhibit V-shaped characteristics. The point at the bottom of the V shape, where the current is lowest, is referred to as a Dirac point, where the carrier density is at the lowest. On a right side of the Dirac point (where the gate voltage is on a high voltage side), electrons are carriers (in an electronic conduction region). As distant farther from the Dirac point (as the gate voltage is higher), the carrier density increases and the source/drain current rises. On the other hand, on a left side of the Dirac point (where the gate voltage is on a low voltage side), positive holes are carriers (in a positive hole conducting region). As distant farther from the Dirac point (as the gate voltage is lower), the carrier density increases and the source/drain current rises. In the vicinity of the Dirac point, the theoretical carrier density is low, and therefore if the carriers slightly increase by thermal excitation and the like, its effect greatly exhibits. Therefore, a slight rise occurs to shape it into a slightly raised U-shaped form, and thus the change in source/drain current as compared to the change in gate voltage is dull. This phenomenon becomes ignorable as distant away from the Dirac point to increase the carrier density, and therefore the change in source/drain current as compared to the gate voltage increases. As distant farther from the Dirac point, the rise in carrier density becomes eventually dull, the change in source/drain current as compared to the gate voltage becomes small again.

Such electric characteristics of the graphene are due to modulation of the Fermi level of the graphene by changing the gate voltage. That is, when the Fermi level is at the Dirac point, the carrier density of the graphene is at the lowest, and then when the gate voltage is increased, the Fermi level is raised and enters the electron conduction region, and then when the gate voltage is further increased, the Fermi level is raised and the carrier density is increased. On the other hand, when the gate voltage is lowered and the Fermi level decreases to lower than the Dirac point, the Fermi level enters the positive hole conducting region. From there, when the gate voltage is further lowered and the Fermi level is lowered, the carrier density starts to rise.

The gate voltage dependency of the source/drain current shown in FIG. 8 shows the typical V-shaped electric characteristics of the graphene described above in each of the light irradiation period and the non-light irradiation period. Further, the V-shaped curve of the light irradiation period shifts to the left-hand side (where the gate voltage is on a low voltage side) as compared to the V-shaped curve of the non-light irradiation period, and thus it is indicated that negative charge is injected to the graphene by the light irradiation. When positive charge appears on the graphene, negative charge is drawn in the graphene by the electrostatic induction, therefore such situation can be made. Here, it can be explained as that the first substance is charged to a positive charge (to be more exact, the amount of charge changed to the positive charge side) by the light irradiation, thus inducing such a change in electric characteristics.

The reason why the current difference ΔI takes a negative value in the case of Vg=50 mV is that the Fermi level is at a position higher than the Dirac point and in the electronic conducting region. This is because if negative charge is injected to the graphene by the light irradiation due to the electronic conduction state, the density of electrons giving rise to carriers rises.

The reason why the absolute values of the current difference ΔI at Vg=−50 mV are entirely small and the positive value is reversed to the negative value along with time is that the Fermi level is at a position slightly lower than the vicinity of the Dirac point, and the Fermi level rises to exceed the Dirac point along with time.

Note that the measurements shown in FIG. 8 were carried out in the order of Vg=−350 mV, −250 mV, −150 mV, −50 mV and 50 mV. Further, before the measurement at Vg=−350 mV, the measurement at Vg=0 mV was carried out. The application of the gate voltage in the sensor element of the embodiment is carried out through a conductive layer with a surface of the element having a high electric resistance, and therefore it requires a predetermined time until the gate voltage becomes stable. The reason why the source/drain current at Vg=−350 mV gradually increases is that the potential at Vg=0 mV just before still remains, and the reason why the source/drain current from at Vg=−250 mV thereafter gradually decreases is that the potential at the immediately previous measurement still remains.

It can be estimated that in the measurement at Vg=−50 mV, the gate voltage is gradually applied by the phenomenon and thus the Fermi level gradually increases. As a result, it can be estimated that the Fermi level, which is slightly lower than the Dirac point, exceeds the Dirac point.

At Vg=−150 mV and −250 mV, the change of the source/drain current by light irradiation increases as the Fermi level shifts farther away from the Dirac point, the reason for this is that, due to the general electrical characteristics of the graphene mentioned above, the change of the source/drain current to the gate voltage, i.e., the gradient is increases as the Fermi level locates farther away from the Dirac point.

At Vg=−350 mV, the change in source/drain current by the light irradiation starts to become smaller as compared to the case of −250 mV, the reason for this is also that, due to the general electrical characteristics of the graphene mentioned above, the change of the source/drain current to the gate voltage, i.e., the gradient becomes smaller when the Fermi level locates greatly away from the Dirac point.

As described above, when the Fermi level of the graphene changes, the degree of the photogating effect changes as well. Further, the Fermi level of the graphene can be modified when the gate voltage is changed. Therefore, by controlling the gate voltage, the Fermi level can be adjusted to maximize the photogating effect or the Fermi level can be fixed to make the photo gating effect constant. For example, when the gate voltage is subjected to feedback control so as to make the source/drain current value in the non-light irradiation period constant, the Fermi level at the ground state of the graphene is fixed, and therefore a certain degree of the photogating effect can be obtained during the light irradiation.

The inventors examined as to whether or not dimethyl trisulfide (DMTS) can be detected using the graphene FET of the embodiment. DMTS is one of sulfide compounds having a structure of $CH_3$—S—S—S—$CH_3$.

For the first substance and the conductive layer, gold nanoparticles and a dry material of citric acid were used. In order to implement such gold nanoparticles and dried material of citric acid to the graphene FET, for example, by performing the following process. First, for example, 10 μL of a dispersion solution containing gold nanoparticles and citric acid is dropped on the graphene, and then the dispersion solution is vaporized by natural drying.

Figure 9:
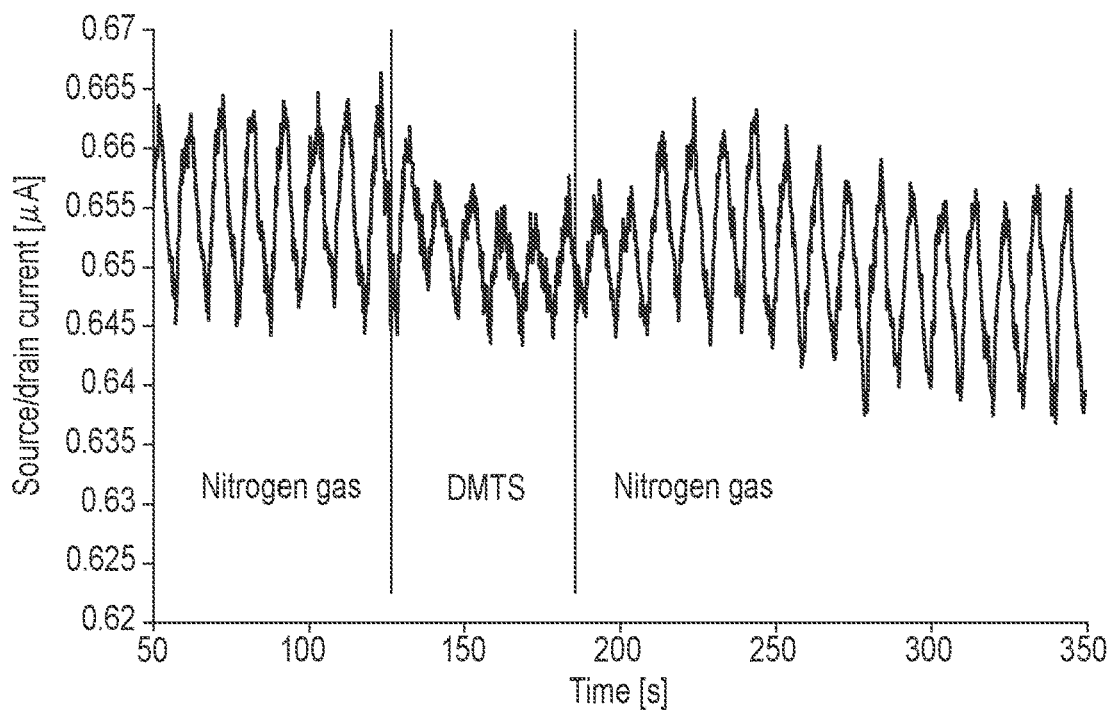
FIG. 9 is a diagram showing the change in source/drain current along with time in each of the cases where a nitrogen gas containing DMTS was supplied to the graphene FET of the embodiment and where nitrogen gas was supplied thereto.
Figure 10:
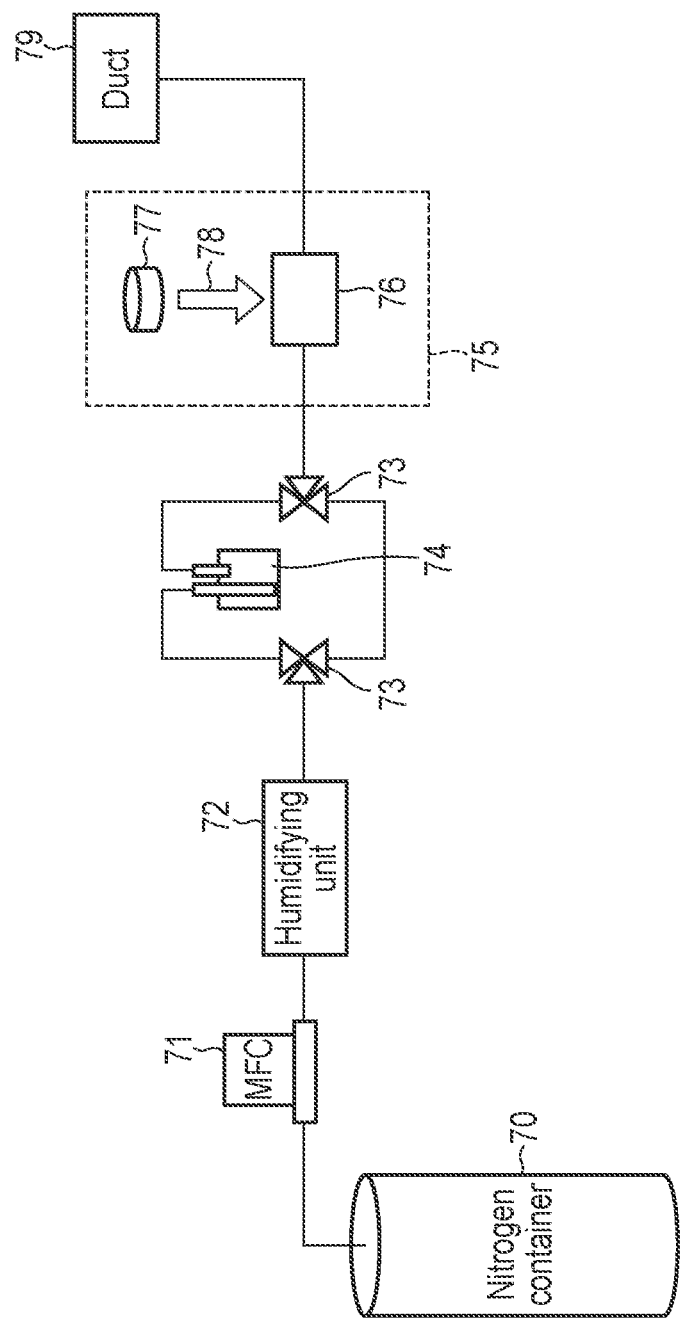
FIG. 10 is a diagram showing a structure of an experimental device used for an experiment to examine the source/drain current of the graphene FET.

FIG. 9 is a diagram showing the change in source/drain current with time in the cases where a nitrogen gas was supplied to the graphene FET of the embodiment and a nitrogen gas containing DMTS was supplied to the graphene FET. FIG. 10 is a diagram showing the configuration of the device used in the experiment which examines the change in source/drain current with time. Dry nitrogen was supplied from a nitrogen gas container 70, and the flow rate is controlled to 200 mL/m by a mass flow controller 71. After that, the gas is humidified to a relative humidity higher than or equal to 98% by a humidifying unit 72, and then it is sent into the sensor element set to an acryl-made transparent cassette 76. An LED light source 77 is placed on the transparent cassette 76 so as to emit and stop the emission light 78 having a wavelength of 660 nm. The acrylic cassette 76 and the LED light source 77 is set in a dark room. A pipe between the humidifying unit 72 and the transparent cassette 76 includes a path to send humidified nitrogen directly to the transparent cassette 76 and a path to send humidified nitrogen containing DMTS to the transparent cassette 76 through an impinger 74 in which DMTS is contained, by a three-way cock 73.

As shown in FIG. 9, after supplying a high-humidity nitrogen gas to the graphene FET of the embodiment, a high-humidity nitrogen gas containing DMTS is supplied, and thereafter a high-humidity nitrogen gas is supplied again. The gate voltage was set to 0 mV and the on/off cycle of the LED light was set to 5 sec/5 sec. Although the illustration is not provided because it is complicated, it shows a behavior in which the source/drain current rises by the irradiation of the LED light. The source/drain current moving up and down in the drawing is the change by the on/off of the LED light which is observed.

It can be understood from FIG. 9 that the difference between the minimum value and the maximum value of the source/drain current in the case where a high-humidity nitrogen gas containing DMTS is supplied is clearly small as compared to the difference between the minimum value and the maximum value of the source/drain current in the case where a high-humidity nitrogen gas not containing DMTS is supplied. Further, the amplitude starts to change from the cycle immediately after the supply of DMTS, which indicates that the presence of DMTS can be detected in real time in about several seconds by the graphene FET of the embodiment. On the other hand, it takes two to three cycles for the response when DMTS becomes absent, therefore it has been found that it requires about several tens of seconds to dissociate the DMTS adsorbed. However, it is more important for a sensor to detect DMTS to quickly respond when the amount of DMTS increases than to quickly respond when the amount of DMTS decreases, and thus the results indicate that the graphene FET of the embodiment is sufficiently useful as a DMTS detection sensor.

On the other hand, FIG. 11 shows the results of the attempt of detecting DMTS with a conventional graphene FET. These are the results of the measurements of the source/drain current carried out using a graphene FET which was not at all subjected to a chemical liquid treatment with gold nanoparticles or the like, contained in an air-tight container with various types of odor components without humidifying in an air-conditioned room. The gate voltage was set to 0 mV and the light irradiation was performed in an on/off cycle of 30 sec/30 sec (which is not illustrated because it is complicated). First, the container only containing air without containing odor components was measured, and then the container was opened and methyl benzoate was contained therein and the container was re-closed and measured, after that container was opened to contain menthol therein and the container was re-closed and measured. The container was air-tightly closed for measurement. Hereinafter, similarly, acetonitrile is contained in the container and then the container is closed, 1-octene-3-ol is contained in the container and then the container is closed, DMTS is contained in the container and then the container is closed, and the source/drain current was measured in each case. When various types of odorant molecules are air-tightly contained, the odorant molecules gradually vaporize to increase the concentration in the air. Therefore, if it is detectable with the conventional technology, the source/drain current should gradually change; however, such a behavior is not observed in all odor components. Further, the photogating effect by the on/off operation of the light irradiation has not been substantially observed, or the change by various types odor components also has not been observed. The results indicate that a great number of odor components, particularly DMTS, cannot be detected by the prior technology. Further, they indicate that it is difficult to utilize the photogating effect in the prior technology itself for the detection of odor.

Note that the graphene FET of the embodiment is expected to detect by adsorption of the sulfide compound to the gold nanoparticles, and therefore even a sulfide compound other than DIMS can be detected. For example, although not shown, the photogating effect was measured in the dark rooms using a rubber blackout curtain, and such a results was obtained that the photogating effect attenuated from the middle. This is estimated as a change which occurred as sulfur-containing components of the vulcanized agent of the rubber fill the dark room as odor components and they are adsorbed to the metal nanoparticles.

The inventors examined whether or not 2-phenylethylamine and methyl benzoate can be detected using the graphene FET of the embodiment. 2-phenylethylamine is a molecule similar to amphetamine, which is a type of stimulant, and methyl benzoate is an odorant molecule of cocaine.

Further, as the first substance and the conductive layer, gold nanoparticles and dry material of citric acid were used. Then, an anti-methamphetamine aptamer was used as the second substance. The anti-methamphetamine aptamer is DNA which binds to methamphetamine or amphetamine of stimulant. In this experiment, to adhere to gold nanoparticles, the 5' end is modified with a thiol group (—SH). The base sequence is "5'SH-TTT ACT GGA GCT CAA TCA GTA CAC GAC GGT TGC AAG TGG GAC TCT GGT AGG CTG GGT TAA TTT GGG ACA AGC TTC AAC CAT GGA GTA 3'".

In order to implement such gold nanoparticles, dry material of citric acid and anti-methamphetamine aptamer to the graphene FET, for example, the following process is carried out. First, for example, 10 μL of a dispersion solution containing the gold nanoparticles and citric acid was dropped on the graphene, and thereafter the dispersion solution was naturally dried. Then, 5 μL of a 1 μM-solution of the anti-methamphetamine aptamer was dropped on the graphene, and then it was sealed in a high-humidity atmosphere so that the aptamer solution would not dry. Thereafter, the graphene FET was left unattended for one hour. Then, a part of the dropped solution was absorbed with moisture absorption paper. Then, the remaining solution was vaporized by natural drying.

Before the experiment of the sensor, the bonding strength with 2-phenylethylamine was measured using an isothermal titration calorimetry (ITC). When an ITC measurement was carried out using an anti-methamphetamine aptamer which was not modified with a thiol group, a dissociation constant of 10 μM was obtained as a result. This means that when the concentration of 2-phenylethylamine is 10 μM, a half number of molecules thereof are bound with the anti-methamphetamine aptamer and the bonding strength of the aptamer is at a standard strength.

FIG. 12 is a diagram showing the change in source/drain current with time in each of the cases where a nitrogen gas containing 2-phenylethylamine was supplied to the graphene FET of the embodiment, where a nitrogen gas containing methyl benzoate was supplied and a nitrogen gas was supplied. The experiment was conducted by the same structure as that of the DMTS detection experiment shown in FIG. 10 and the odor molecule placed in the impinger was changed from DMTS to 2-phenylethylamine and methyl benzoate. The flow rate was set to 200 mL/m as in the case of FIG. 10, and the nitrogen gas containing 2-phenylethylamine, the nitrogen gas containing methyl benzoate and the nitrogen gas were each supplied through a humidifying unit to have a humidity 98% or higher, to the graphene FET of the embodiment. Similarly, the LED light source used here was of a wavelength of 660 nm and the on/off cycle was set to 5 sec/5 sec. The gate voltage was set to 0 mV.

As shown in FIG. 12, first, after building a pipe line to which an impinger containing 2-phenylethylamine is connected, a high-humidity nitrogen gas was supplied to the graphene FET of the embodiment, and then a high-humidity nitrogen gas containing 2-phenylethylamine was supplied, and then a high-humidity nitrogen gas was supplied, and after reconnecting the pipe line to an impinger containing methyl benzoate, a high-humidity nitrogen gas was supplied, and then a high-humidity nitrogen gas containing methyl benzoate was supplied, and a high-humidity nitrogen gas was supplied.

It can be seen from FIG. 12 that the difference between the minimum and maximum values of the source/drain current when the high-humidity nitrogen gas containing 2-phenylethylamine was supplied is clearly smaller than the difference between the minimum and maximum values of the source/drain current when the high-humidity nitrogen gas was supplied. Further, it is also found that the response took within several seconds after switching the gas. Therefore, it can be concluded from FIG. 12 that the graphene FET of the embodiment can detect 2-phenylethylamine easily and in real time based on the change in source/drain current by the photogating effect.

On the other hand, the difference between the minimum and maximum values of the source/drain current when a high-humidity methyl benzoate gas was supplied is not very much different from the difference between the minimum and maximum values of the source/drain current when the high-humidity nitrogen gas was supplied. This result indicates that 2-phenylethylamine was selectively detected in this experiment.

As discussed above, with use of the graphene FET of the embodiment, 2-phenylethylamine can be detected in such a manner that it is distinguished from methyl benzoate. In other words, it is indicated that a stimulant can be detected selectively without mistaking it for cocaine.

Note that methyl benzoate can be detected when the second substance 19a which specifically bonds to methyl benzoate is used.

The graphene FET of the embodiment can detect target substances other than those mentioned above and difficult or impossible to be detected by the conventionally well-known graphene FET, that is, for example, an ecgonine derivative, which is another odor component of cocaine, a stimulant such as methamphetamine or amphetamine, caryophyllene, which is an odor component of cannabis and a derivative thereof, heliotropin which is an odor component of methylene dioxymethamphetamine (MDMA, a hallucinogenic drug commonly called ecstasy) or MDP2P (3,4-methylene dioxyphenyl propane-2-one) and the like. Further, based on the detection of these odor components, it is possible to detect the presence of cocaine, a stimulant, cannabis and MDMA, which are sources of the respective odors. For detecting these other target substances, a material which bonds to a respective one of these target substances is used for the second substance 19a. In order to obtain the second substance which bonds to a specific target substance, for example, in the case where the second substance is a nucleic acid aptamer, a method of systematic evolution of ligands by exponential enrichment (SELEX) can be adopted. In the SELEX method, a nucleic acid library containing about 1,014 kinds of sequences is mixed with the target substances, and the bounded substances are extracted and amplified by polymerase chain reaction (PCR). In the PCR-amplified nucleic acid pool, those sequences bonding to the target substance are present at high concentration. Therefore, according to this method, the above-obtained resultant is mixed with the target substances again, and those sequences bonding to the target substances are extracted and PCR (polymerase chain reaction)-amplified, and this process is repeated, thereby making it possible to gradually increase the concentration of the sequence having high bonding ability.

Further, with the graphene FET of the embodiment, limonene, which is a main ingredient of the odor of citrus fruits, can be detected. Limonene is an uncharged monoterpene represented by chemical formula: $C_{10}H_{16}$, and it is difficult to detect with the conventional sensor. For a molecular probe bonding to limonene, the inventors have find that a peptide with an amino acid sequence of an N-terminus-RRWLLLW-C-terminus is strongly bondable. Here, R is the abbreviation for arginine, W for tryptophan, and L for leucine. The dissociation constant measured by the ITC method was 12 µM.

First, 10 µL of a 500 nM-solution of a peptide with an amino acid sequence of N-terminus-CGGGRGAGAGAR-C-terminus was dropped on the graphene, and the resultant was left unattended in a high-humidity atmosphere for one hour, followed by washing with pure water. Here, C is the abbreviation for cysteine, G for glycine and A for alanine. The peptide of this arrangement has been confirmed that the portion of GAGAGA forms a p sheet structure and a monomolecular film is self-organized on the graphene. Thus, the thiol groups (—SH group of cysteine side chain) coupling to the gold nanoparticles are aligned on the graphene. Thereafter, 10 µL of a gold-nanoparticle dispersed solution was dropped, and naturally dried. Then, a 1 µM-solution of a peptide with a sequences of N-terminus-RRWLLLWRRCC-C-terminus was dripped and left unattended in a high-humidity atmosphere for one hour. A part of the dropped solution was absorbed with moisture absorption paper, and then the remaining solution was vaporized and dried naturally. The reason why an amino acid of RRCC was to the C-terminal side was to enhance the solubility of the peptide to water by RR and to immobilize to the gold nanoparticles by CC. When the change in source/drain current by the photogating effect when the graphene FET subjected to the above-described treatment was air-tightly contained with pure water and limonene was compared with the change source/drain current by the photogating effect when it was contained with only pure water, the change in current was less in the former case (not shown), and thus it was confirmed that limonene can be detected by the graphene FET of the present embodiment. Further, limonene is a main ingredient of the odor of citrus fruits, the presence of a citrus fruit, which is a source of generation of limonene can be also detected by the graphene FET of the present embodiment. Note that, in Japan, the import of citrus fruits is prohibited as the protection measures at ports and airports against the fruit fly, which is an exotic species causing serious damage to cultivation of citrus fruits. The graphene FET by the embodiment can be also used as a detection sensor of citrus fruits, which may be illegally brought in at airports or the like.

As described above, according to the present embodiment, various target substances can be detected in real time, and also can be selectively identified.

A sensor circuit, a sensor system and a detection method, which uses the graphene FET of the present embodiment will be described. With use of the graphene FET of the embodiment, a sensor circuit, a sensor system and a detection method which can detect various odor components and objects which produce these odor components can be provided.

Figure 13:
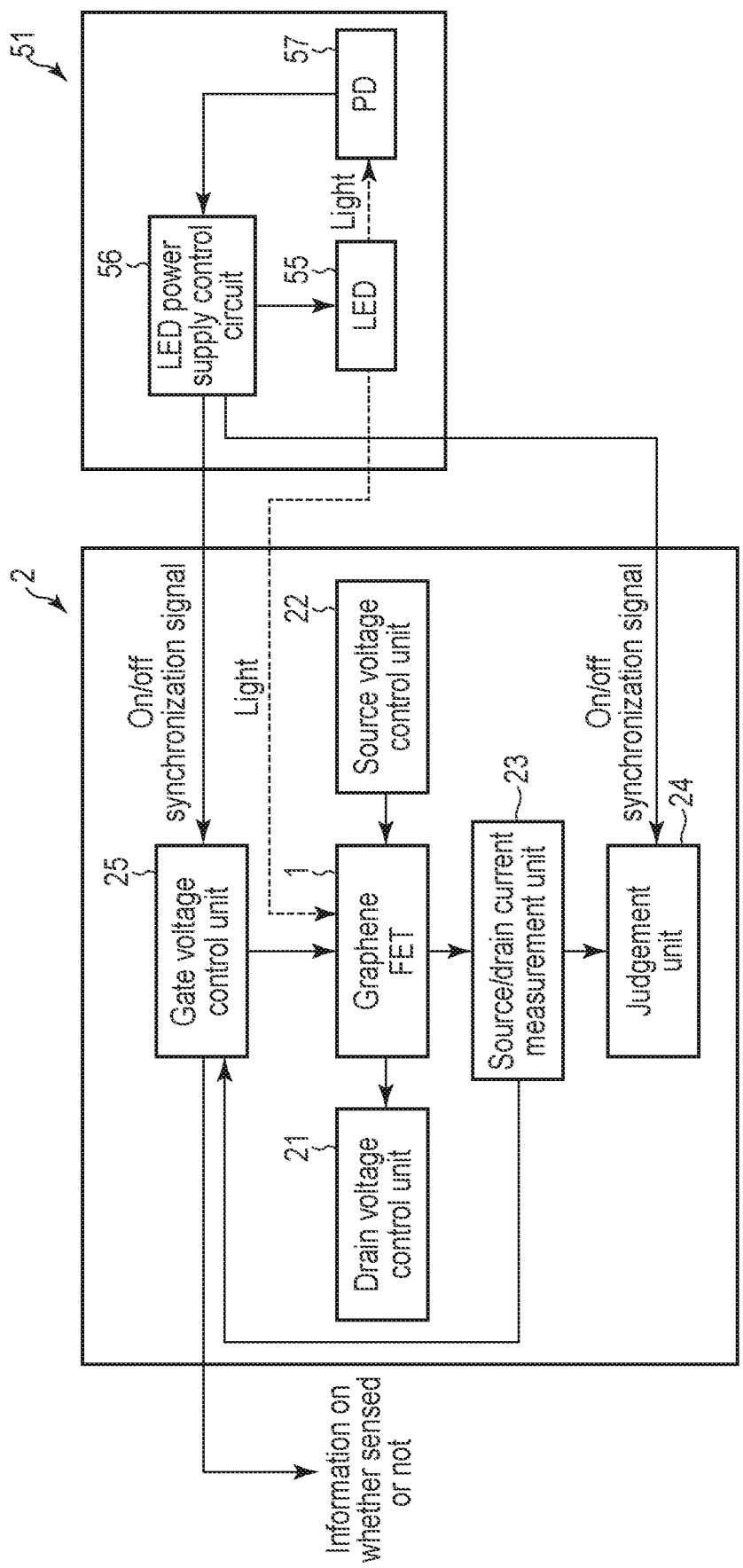
FIG. 13 is a block diagram showing a sensor circuit and a light source circuit of the embodiment.

FIG. 13 is a block diagram showing a sensor circuit (sensor device) 2 and a light source circuitry of the embodiment.

The sensor circuit 2 comprises a graphene FET 1, a drain voltage control unit 21, a source voltage control unit 22, a source/drain current measurement unit 23, a judgement unit 24 and a gate voltage control unit 25. The elements 1 and 21 to 25, which constitute the sensor circuit 2 may be formed on, for example, a silicon substrate or a module on which a graphene FET chip is implemented, or in a system housing in which a replacement cartridge on which a graphene FET chip is implemented, is inserted. Note that, in FIG. 13, there is one graphene FET 1, but the number of the FETs 1 may as well be two or more. Further, a plurality of graphene FETs 1 for different types of target substances may be integrated into one chip, or a plurality of graphene FET chips may be implemented at high density on a wiring chip using a chip laminating technique. The light source circuit 51 comprises an LED chip 55, which is a light source, a power supply control circuit 56 which controls the drive current or drive voltage of the LED chip 55 and a photodetector (PD) 57 which measures the amount of light of the LED chip 55. The LED power supply control circuit 56 adjusts the current value or voltage value based on information on the amount of light from the PD 57 as needed. Further, the LED power supply control circuit 56 also controls the blinking according to the designated on/off cycle and send its synchronization signal to the judgement unit 24 and the gate voltage control unit 25 of the sensor circuit 2. The light source circuit 51 is formed in the system housing in which the replacement cartridge mounted with structural elements including the graphene FET chip 1 is inserted.

The drain voltage control unit 21 controls the voltage to be applied to the drain electrode of the graphene FET 1. The source voltage control unit 22 controls the voltage to be applied to the source electrode of the graphene FET 1. The source/drain current measurement unit 23 measures the source/drain current flowing between the source electrode and the drain electrode of the graphene FET 1.

The judgement (determination) unit 24 judges (determines) whether a target substance is detected (presence/absence of the target substance) based on the measured source/drain current and the synchronization signal sent from the light source circuit. The judgement unit 24 may judge concentration of the target substance, or both the presence/absence of the target and the concentration of the target substance. The details will be provided.

The change (waveform) in source/drain current with time when the graphene FET 1 was exposed to a high-humidity atmosphere while changing the concentration of the target substance is acquired in advance together with the synchronization signal of the light source. Further, the change (waveform) in source/drain current with time when the graphene FET 1 is exposed to a high-humidity atmosphere which does not contain the target substance is also obtained in advance together the synchronization signal of the light source. The information on the changes in source/drain current with time are stored in, for example, the judgement unit 24 as reference data of the concentration-dependency. In addition, a predetermined threshold is set and is also stored in, for example, the judgement unit 24.

The judgement unit 24 judges the concentration of the target substance in the high humidity atmosphere based on the measured source/drain current and the reference data. When the variation of the change in the measured source/drain current with time in the on/off operations of the light source is greater than the threshold, it is judged that the target substance is contained in the high humidity atmosphere. When the variation of the change in the measured source/drain current with time in the on/off operations of the light source is less than the threshold, it is judged that the target substance is not contained in the high humidity atmosphere.

The judgment is made by, for example, the following manner. That is, the absolute value of the difference in source/drain current between a value after a lapse of a predetermined time from the point of the irradiation of light and a value after a lapse of a predetermined time from the point of stopping of the light irradiation is continually measured. When the variation in the value is greater than the threshold, it is judged that the target substance is contained in the high humidity atmosphere, whereas when the variation in absolute value remains smaller than the threshold, it is judged that the target substance is not contained in the high humidity atmosphere. Note that the cycle of blinking of the light source, the duty ratio, the time for measuring the source/drain current after the light irradiation, the time for measuring the source/drain current after stopping the light irradiation and the threshold can be set as needed for an optimal value according to the type of the target substance and the type of the graphene FET.

Figure 16:
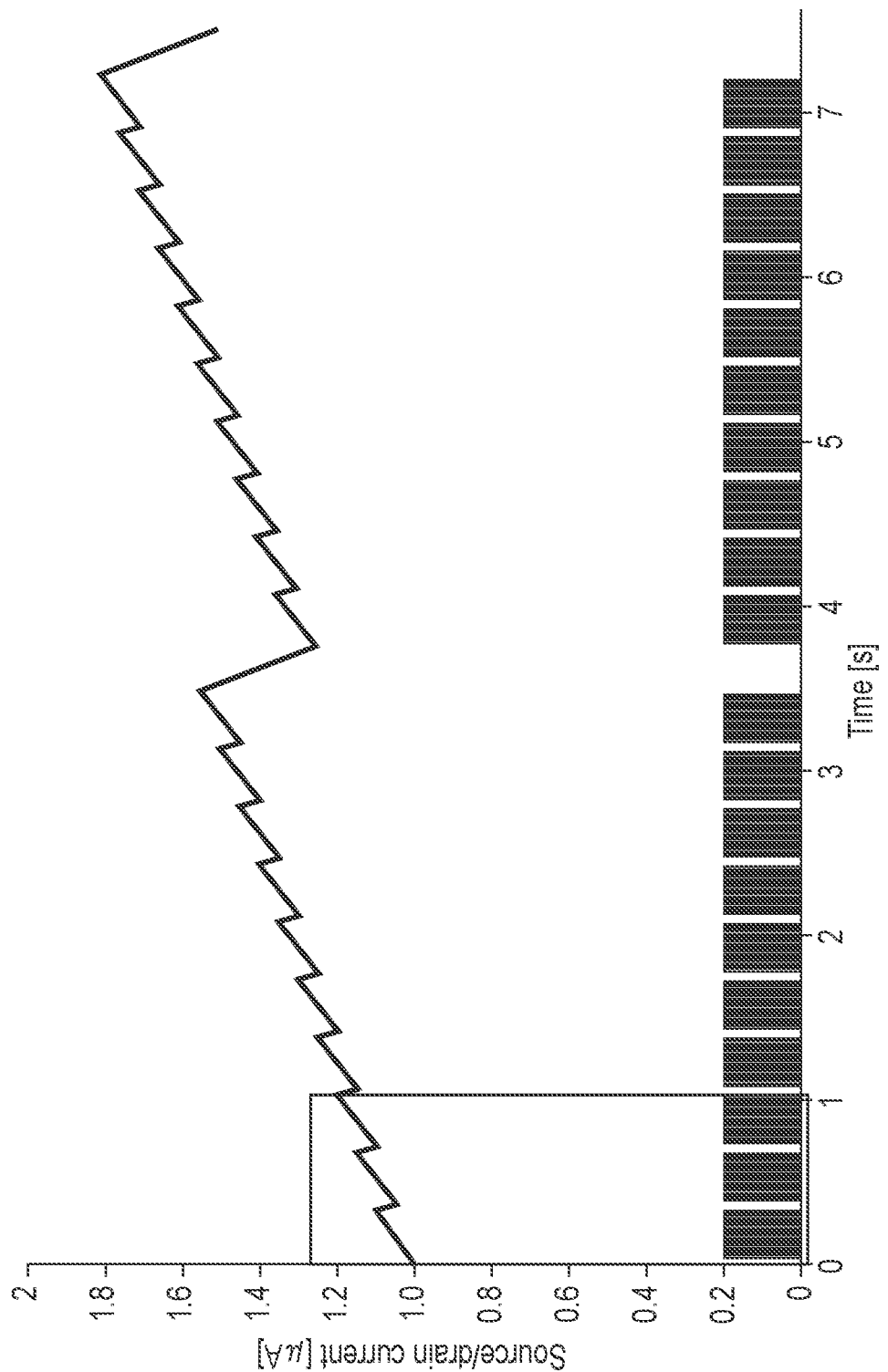
FIG. 16 is a diagram showing change in source/drain current along with time, which illustrates another inspection method.
Figure 17:
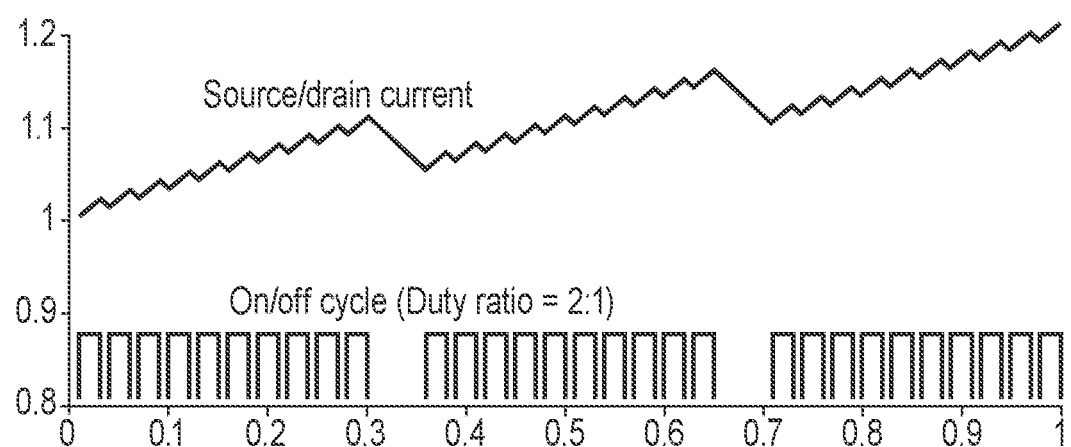
FIG. 17 is a partially enlarged diagram showing a part of the change in source/drain current shown in FIG. 16.

The above-discussed embodiment is provided in connection with an example case of a simple on/off cycle, but a plurality of periods may be overlapped on a heterodyne. An example thereof is shown in FIG. 16 and FIG. 17. FIG. 17 is an enlarged view of the range surrounded by a solid line in FIG. 16. The duty ratio was set to 2:1, and first, an on/off cycle of 20 ms/10 ms is provided for 10 cycles and 300 ms. Here, the light irradiation period is a total of 200 ms, whereas the non-light irradiation period is a total of 100 ms. Therefore, for a difference of 100 ms, a non-light irradiation period of 50 ms is given at a duty ratio of 2:1. Thereby, a cycle of 300 ms of a light blinking period and 50 ms of a non-light irradiation period is created and thus ten cycles are given for 3.5 seconds. At this time, the difference between the light irradiation period and the non-light irradiation period is 500 ms, and therefore a non-light irradiation period of 250 ms is given at a duty ratio of 2:1. Thus, a 3.75-second cycle of a light blinking period/non-light irradiation period is created and further, ten cycles of 37.5 seconds are given. In this manner, a plurality of different periods are superimposed, and thus a plurality of information items on the time response of the change in source/drain current by the photogating effect can be obtained. For example, a high-speed response at the moment of blinking and a subsequent slow response can be acquired at once. Further, the present embodiment introduces an example in which units of 10 cycles are superposed at a duty ratio of 2:1, but the duty ratio and the cycle number may be arbitrarily changed according to the information to be acquired.

The gate voltage control unit 25 controls the gate voltage based on the measured source/drain current.

Here, the gate voltage is a difference of a potential of the gate electrode to a potential of the source electrode (gate-source potential), or a difference of the potential of the gate electrode to a potential of the drain electrode (gate-drain potential), and generally the gate voltage is the gate-source potential. That is, the gate voltage control unit 25 controls, for example, the potential difference between the source electrode and the gate electrode, or the potential difference between the drain electrode and the gate electrode. Consequently, the gate voltage control unit 25 apparently controls the potential of the source electrode (or the drain electrode) by applying a same bias voltage to the source and drain electrodes when the potential of the gate electrode is set as a reference.

The changing of gate voltage, the changing of the potential difference between the gate electrode and the source electrode and the changing of the potential difference between the gate electrode and the drain electrode are substantially the same.

In particular, when the potential of the source electrode (or the drain electrode) is fixed at the ground potential, it seems that the potential of the gate electrode is changed, however what is really changed is the potential difference between the source electrode (or the drain electrode) and the gate electrode. Similarly, when the potential of the gate electrode is fixed at the ground potential, it seems that the potential of the source electrode (or drain electrode) is changed, however what is really changed is the potential difference between the source electrode (or the drain electrode) and the gate electrode.

The details will be provided. That is, the change in source/drain current when the irradiation light is blinked while varying the gate voltage is measured in advance and then, the gate voltage at which the change in source/drain current becomes maximum and an optimal range of the source/drain current value are measured in advance. In this case, the source/drain current value for determining the range may be a value at the time of the light irradiation, or the value after a lapse of a predetermined time from the point of the irradiation of light, or the value after a lapse of a predetermined time from the point of stopping of the light irradiation, or both of a value at the time of the light irradiation and a value after stopping the light irradiation may be used. Alternatively, an average value of the two values and an average value in the light blinking period may be used. It is important to use the value that is most easily used in the fixation of the Fermi level of the graphene. The measured gate voltage and the optimal range of the source/drain current value are stored as reference data in, for example, the gate voltage control unit 25. When carrying out the measurement next time, first, the gate voltage control unit is used to apply a gate voltage in the optimal gate voltage range acquired in advance as reference data. At the same time, based on the value of the source/drain current measured by the source/drain current measurement unit, the on/off synchronization signal sent by the LED power supply control circuit is also used as needed, and the gate voltage is adjusted to make it in the optimal source/drain current range acquired as the reference data as needed. After having been able to adjust the source/drain current within the optimal range, a signal notifying that the measurement by the sensor is ready to start is output. The signal is input to, for example, the judgement unit 24 and the judgement unit 24 carries out judgment based on the source/drain current measurement unit 23. On the other hand, when not having been able to adjust the measured source/drain current in the optimal range, a signal indicating that the measurement has not been prepared to start is output. Based on these signals, the sensing system carries out operations such as controlling the operation and stopping of the operation of the measurement, or recording as a condition when a measurement result is acquired.

Further, it is also assumed that due to various external disturbance noises and the like, the source/drain current fluctuates and deviates from the optimal range. In order to avoid this, the gate voltage is adjusted, as needed, to contain the source/drain current value in the optimal range while monitoring the source/drain current value in sensing.

Figure 14:
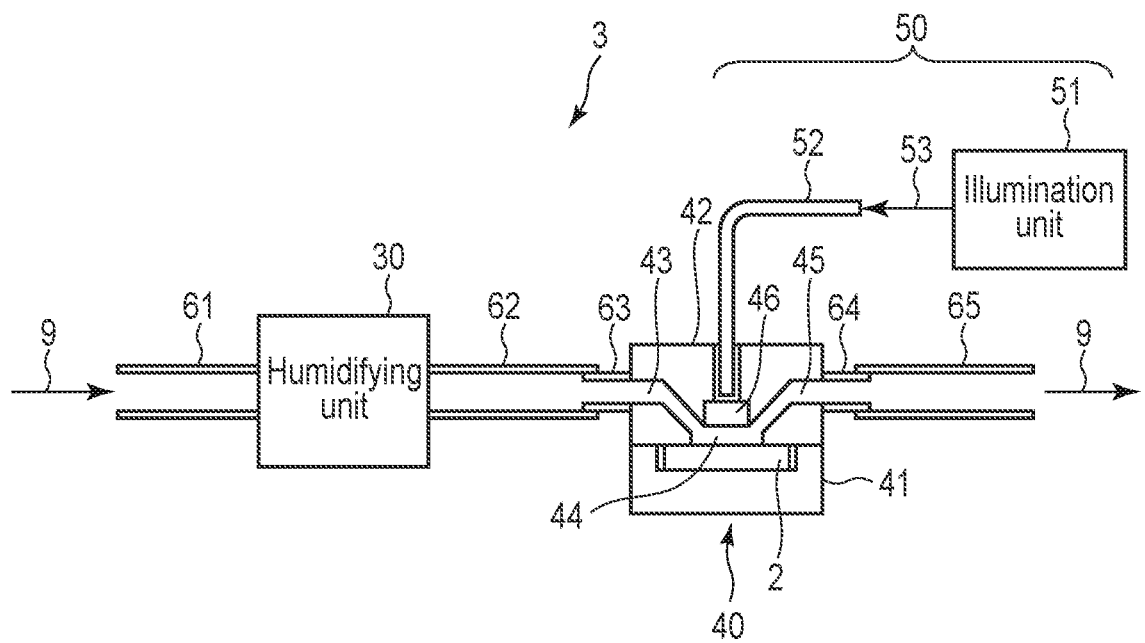
FIG. 14 is a block diagram showing a sensor system of the embodiment.

FIG. 14 is a block diagram showing a sensor system 3 of the embodiment.

The sensor system 3 comprises a humidifying unit 30, a sensor unit 40, an irradiation unit 50 and pipes 61 to 65.

The pipe 61 is connected to the humidifying unit 30. A gas (specimen gas) which may contain a target substance 9 is introduced into the humidifying unit 30 through the pipe 61. The humidifying unit 30 humidifies the introduced gas 9.

The specimen gas humidified by the humidifying unit 30 is introduced into the sensor unit 40 through the pipe 62 and the pipe 63. An end of the pipe 63 is connected to the pipe 62, and the other end of the pipe 63 is connected to the sensor unit 40.

The sensor unit 40 includes a graphene FET 1, a first member 41 and a second member 42.

A recess portion is provided in the surface of the first member 41, and a part 2 including the graphene FET 1 is provided in this recess portion.

The second member 42 is provided on the first member 41. The second member 42 includes a first gas passage 43, a hollow portion 44, a second gas passage 45 and a window portion 46.

In the hollow portion 44, the graphene of the graphene FET 1 is exposed to inside the hollow portion 44.

The first gas passage 43 connects the hollow portion 44 and the pipe 63 to each other. Consequently, the specimen gas with high humidity introduced form the pipe 63 is supplied to the graphene of the graphene FET 1.

The second gas passage 45 is provided to exhaust the specimen gas supplied to the graphene of the graphene FET 1. The second gas passage 45 is connected to the pipe 64, and the pipe 64 is connected to the pipe 65. The pipe 64 is provided on the second member 42. An end of the pipe 64 is connected to the second gas passage 45, and the other end of the pipe 64 is connected to an end of the pipe 65.

The other end of the pipe 65 is connected to an exhaust system (not shown) including a suction pump and the like. As a result, the specimen gas 9 introduced from the pipe 61 is exhausted from the pipe 65 via the humidifying unit 30, the sensor unit 40 and the like.

The window portion 45 is provided above the hollow portion 44. The window portion 45 is transparent to irradiation light. That is, the irradiation light can pass through the window portion 45. General examples of the transparent material are acryl resin, glass and quartz. On the other hand, the part of the member 42 other than the window portion 45 is formed of a light-shielding material.

Further, the sensor part 2 inserted to the recess portion of the first member 41 can be of an exchangeable cartridge type. For example, the first member 41 and the second member 42 are openable and closable, and when the first member 41 and the second member 42 are closed again after storing the sensor part 2 in the recess portion, the graphene portion of the sensor parts 2 is aligned with the position of the hollow portion 44, and electric input-output terminals formed in the sensor part are brought into contact with connector terminals formed in either one of the first member 41 and the second member 42, thereby making it possible to perform electrical input and output from the sensor unit 40 or the outside thereof.

Furthermore, although not shown, a temperature regulation device can be incorporate to the sensor unit 40 as needed. For the temperature regulation device, for example, a Peltier element or the like is used.

The irradiation unit 50 includes a light source 51 and an optical fiber 52 (an optical transmission path). The light source 51 produces light to be used as the irradiation light. A portion of the optical fiber 52 on a light outlet side is connected to the window portion 45 through a hole provided in the second member 42. Consequently, light 53 emitted from the light source 51 is irradiated to the graphene of the graphene FET 1 through the optical fiber 52. In addition, such devising is carried out that a light-shielding material is filled into a gap between the hole formed in the second member 42 and the optical fiber so as to prevent external light from leaking through the gap. More specifically, such a method as providing light-shielding rubber in the outlet portion of the hole of the second member 42 or applying a light-shielding adhesive is employed.

Figure 15:
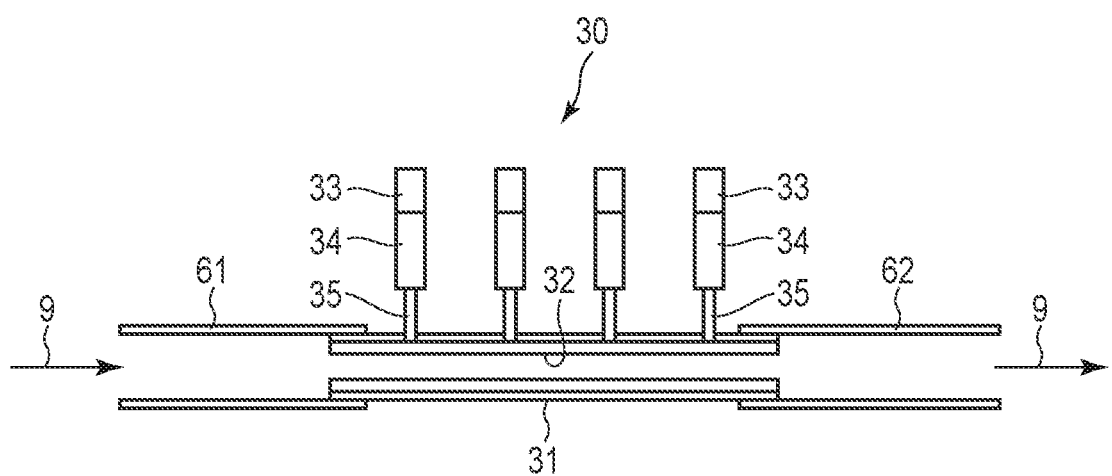
FIG. 15 is a diagram showing an example of the structure of a humidifying unit.

FIG. 15 is a diagram showing an example of the structure of the humidifying unit 30.

The humidifying unit 30 includes a pipe 31, a hydrophilic nonwoven fabric material 32 provided on an inner wall of the pipe 31, and a water supply unit 33 which supplies water to the hydrophilic nonwoven fabric material 32.

The water supply unit 33 includes a container 34 in which water is stored and a thin cylindrical supply unit 35 which supplies water stored in the container 34 to the hydrophilic nonwoven fabric material 32. A supply unit 36 penetrates the pipe 31 to be in contact with the hydrophilic nonwoven fabric material 32.

Note that, although not shown, a thermo-hygrometer can be set in the sensor system. The thermo-hygrometer may be installed, for example, in middle of the pipe 65 or the like.

Figure 18:
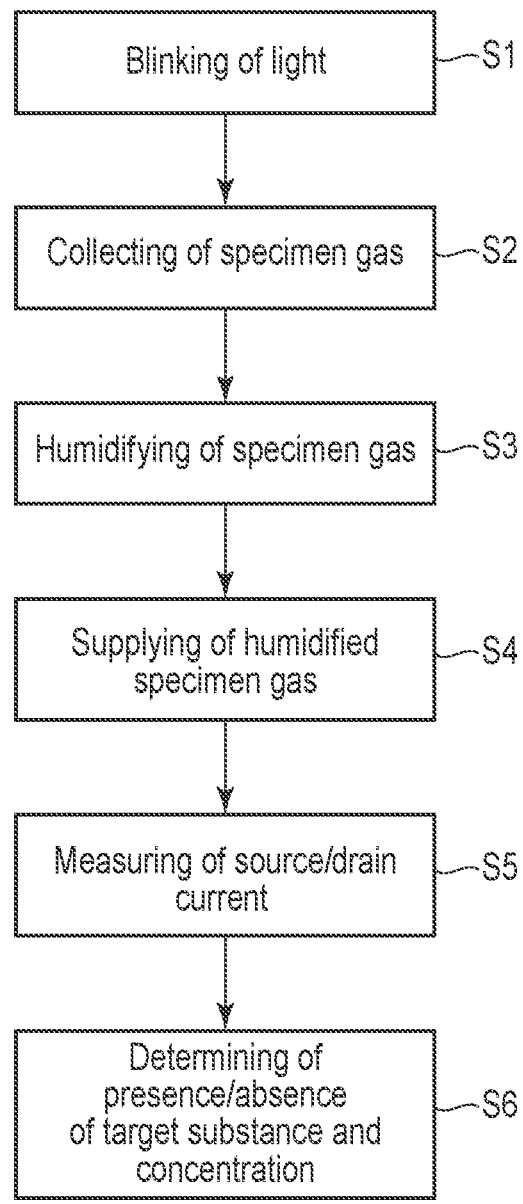
FIG. 18 is a flow chart showing a detection method of an embodiment.

FIG. 18 is a flow chart showing a detection method of an embodiment. The detection method of the embodiment uses the graphene FET of the embodiment (to be simply referred to as graphene FET hereinafter).

The detection method of the embodiment comprises a step of blinking light on the graphene of the graphene FET (a first step), a step of collecting a gas (specimen gas) which may possibly contain a target substance (a second step), a step of humidifying the collected specimen gas (a third step), a step of supplying the humidified specimen gas to the graphene FET (a fourth step), a step of measuring a source/drain current flowing between a source electrode and a drain electrode of the graphene FET (a fifth step), a step of determining whether the target substance is contained in the specimen gas based on the current measured in the fifth step and determining of concentration of the target substance when it is contained (a sixth step).

The first step (blinking of light) is carried out using, for example, the irradiation unit 50 of FIG. 13 and the light source circuit 51 of FIG. 13.

The second step (collecting of the specimen gas) is carried out using, for example, a pipe 61 of FIG. 14 and an intake opening (not shown) provided at a distal end thereof.

The third step (humidifying of the specimen gas) is carried out, for example, using the humidifying unit 50 of FIG. 14.

The fourth step (supplying of the humidified specimen gas) is carried out using, for example, the pipes 62 to 65 of FIG. 14 and the exhaust system (not shown).

The fifth step (measuring of the source/drain current) is carried out using, for example, the sensor unit 40 of FIG. 14 (in more detail, the source/drain current measurement unit 23 of FIG. 13).

The sixth step (judging the presence/absence of the target substance and/or the concentration thereof) is carried out using, for example, the sensor unit 40 of FIG. 14 (in more detail, the judgement unit 24 of FIG. 13).

Figure 19:
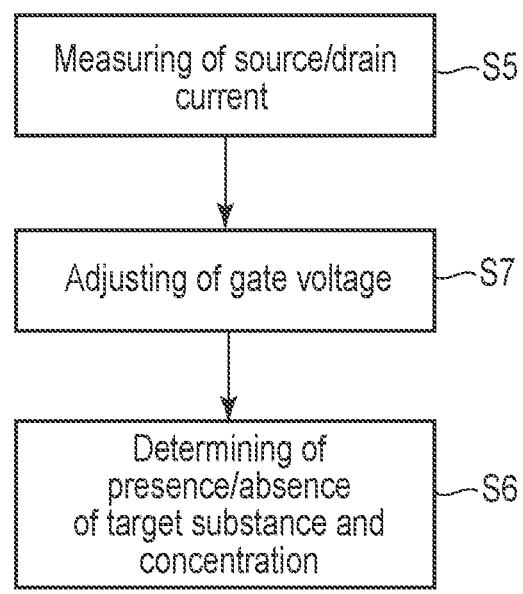
FIG. 19 is a flow chart showing a modification example of the detection method of the embodiment.

Further, as shown in FIG. 19, a seventh step may be added. In the seventh step, the gate voltage is adjusted so that the source/drain current value of the graphene of the graphene FET falls in the optimal range based on the source/drain current measured in the fifth step may be performed. The seventh step is carried out using, for example, the sensor unit 40 of FIG. 14 (in more detail, the gate voltage control unit 25 of FIG. 13). The sixth step is performed after the seventh step.

Note that the sensor system 3 of FIG. 14 may carry out all of the first to seventh steps using a plurality of sensor systems (or devices) which can execute all of the first to seventh steps. In other words, the steps carried out for the respective sensor systems (devices) may be different from each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor element capable of detecting a target substance contained in an atmosphere, the sensor element comprising:
    a graphene;
    a drain electrode provided on the graphene;
    a source electrode provide on the graphene;
    a first substance provided on the graphene and having a charge condition and including carboxyl group, phosphate group, sulfonic group, silanol group, hydroxyl group, or amino group, wherein the charge condition is changed when irradiation of light and stopping of the irradiation of the light are performed; and
    a humidification mechanism configured to humidify the atmosphere,
    the target substance being detectable by measuring current that flows between the source electrode and the drain electrode, the measuring of the current being performed in a period during which the irradiation of the light and the stopping of the irradiation of the light are repeated above the sensor element, and
    the measuring of the current being performed after the atmosphere is humidified by the humidification mechanism.

2. The sensor element of claim 1, wherein:
    the current in the period differs in a first case and a second case,
    the first case is that the sensor element is subjected to the atmosphere containing the target substance, and
    the second case is that the sensor element is subjected to the atmosphere not containing the target substance.

3. The sensor element of claim 1, wherein:
    the first substance includes a substance capable of inducing charge transfer between the graphene and the first substance, or a metal particle.

4. The sensor element of claim 1, wherein:
    the current in a period during which the light is irradiated and the current in a period during which the light is not irradiated in a case where the sensor element is subjected to the atmosphere containing the target substance is different from the current in the period during which the light is irradiated and the current in the period during which the light is not irradiated in a case where the sensor element is subjected to the atmosphere not containing the target substance.

5. The sensor element of claim 1, wherein:
    a difference between a value of the current in a period during which the light is irradiated and a value of the current in a period during which the light is not irradiated are different between a third case and a fourth case,
    the third case is that the graphene and the first substance are subjected to the atmosphere containing the target substance, and
    the fourth case is that the graphene and the first substance are subjected to the atmosphere not containing the target substance.

6. The sensor element of claim 1, further comprising a gate electrode for applying a voltage to the graphene.

7. The sensor element of claim 6, further comprising: one of gold, platinum, silver and silver chloride, provided on a surface of the gate electrode.

8. The sensor element of claim 6, further comprising: a conductive layer provided between the gate electrode and the graphene.

9. The sensor element of claim 8, wherein:
    an electric resistance between the gate electrode and the graphene is between 10 M$\Omega$ and 100 G$\Omega$.

10. The sensor element of claim 1, further comprising: a second substance provided to at least one of the first substance, the graphene and the conductive layer, and configured to be specifically bonded to the target substance.

11. The sensor element of claim 1, wherein:
    the target substance is one of a sulfide compound, limonene, methyl benzoate, ecgonine derivative, methamphetamine, amphetamine, caryophyllene and a derivative thereof, heliotropin and 3, 4-methylene dioxyphenylpropane-2-one (MDP2P).

12. A sensor device comprising:
    a sensor element of claim 1;
    a measurement unit configured to measure a current flowing between a source electrode and a drain electrode of the sensor element; and
    a judgement unit configured to judge one of presence or absence of the target substance and a concentration of the target substance.

13. The sensor device of claim 12, wherein the sensor element includes a gate electrode, and
    further comprising: a gate voltage control unit configured to control a gate voltage applied to the gate electrode based on the current measured by the measurement unit.

14. The sensor device of claim 13, wherein:
    the gate voltage control unit configured to adjust the gate voltage such that a value of the current flowing between the source electrode and the drain electrode of the sensor element falls in a predetermined range, and
    the value of the current is a first value of the current at a time of light irradiation, a second value of the current at a time of stopping the light, or an average value of the first value and the second value.

15. A sensor system comprising:
    a sensor unit including a sensor device of claim 13;
    a humidification unit configured to humidify gas that potentially contains a target substance; and
    an irradiation unit which irradiates light to the sensor device.

16. The sensor system of claim 15, wherein:
    the irradiation unit comprises a light source, and a light blinking control unit connected to the light source and configured to control blinking of light generated by the light source.

17. The sensor system of claim 15, further comprising:
    a pipe configured to connect the humidifying unit and the sensor unit to each other and supply the humidified gas to a sensor element of the sensor device.

18. The sensor system of claim 15, wherein:
the sensor device detects one of a sulfide compound, limonene, methyl benzoate, ecgonine derivative, methamphetamine, amphetamine, caryophyllene, a derivative of amphetamine, caryophyllene, derivative of caryophyllene, heliotropin and 3, 4-methylene dioxyphenylpropane-2-one (MDP2P).

19. A detection method employing a sensor element of claim 1, the method comprising:
repeating irradiation of light and stopping thereof above a graphene of the sensor element;
humidifying a gas that potentially contains a target substance;
supplying the humidified gas to the sensor element;
measuring a current flowing between the a source electrode and a drain electrode of the sensor unit; and
judging one of presence or absence of the target substance and concentration of the target substance based on the measured current.

20. The sensing method of claim 19, further comprising applying voltage to the graphene such that a value of the current flowing between the source electrode and the drain electrode of the sensor element falls in a predetermined range, and
the value of the current is a first value of the current at a time of light irradiation, a second value of the current at a time of stopping the light, or an average value of the first value and the second value.

* * * * *